(12) United States Patent
Langhammer

(10) Patent No.: US 10,838,695 B2
(45) Date of Patent: *Nov. 17, 2020

(54) FIXED-POINT AND FLOATING-POINT ARITHMETIC OPERATOR CIRCUITS IN SPECIALIZED PROCESSING BLOCKS

(71) Applicant: ALTERA CORPORATION, San Jose, CA (US)

(72) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,578

(22) Filed: Jun. 4, 2019

(65) Prior Publication Data

US 2019/0286417 A1 Sep. 19, 2019

Related U.S. Application Data

(63) Continuation of application No. 16/056,173, filed on Aug. 6, 2018, now Pat. No. 10,318,241, which is a
(Continued)

(51) Int. Cl.
*G06F 7/483* (2006.01)
*G06F 7/485* (2006.01)
(Continued)

(52) U.S. Cl.
CPC .............. *G06F 7/485* (2013.01); *G06F 5/012* (2013.01); *G06F 5/16* (2013.01); *G06F 7/483* (2013.01);
(Continued)

(58) Field of Classification Search
CPC ........ G06F 7/483; G06F 7/485; G06F 7/5443; G06F 2207/3824
See application file for complete search history.

(56) References Cited

U.S. PATENT DOCUMENTS 5,809,292 A 9/1998 Wilkinsin et al.
6,538,470 B1 3/2003 Langhammer
(Continued)

FOREIGN PATENT DOCUMENTS

WO W02012007799 1/2012

OTHER PUBLICATIONS

Xilinx, Inc., "UltraScale Architecture DSP Slice User Guide"; UG579 v1.3 (Nov. 2015).
(Continued)

*Primary Examiner* — Chuong D Ngo
(74) *Attorney, Agent, or Firm* — Fletcher Yoder, P.C.

(57) ABSTRACT

The present embodiments relate to circuitry that efficiently performs floating-point arithmetic operations and fixed-point arithmetic operations. Such circuitry may be implemented in specialized processing blocks. If desired, the specialized processing blocks may include configurable interconnect circuitry to support a variety of different use modes. For example, the specialized processing block may efficiently perform a fixed-point or floating-point addition operation or a portion thereof, a fixed-point or floating-point multiplication operation or a portion thereof, a fixed-point or floating-point multiply-add operation or a portion thereof, just to name a few. In some embodiments, two or more specialized processing blocks may be arranged in a cascade chain and perform together more complex operations such as a recursive mode dot product of two vectors of floating-point numbers or a Radix-2 Butterfly circuit, just to name a few.

20 Claims, 10 Drawing Sheets

Related U.S. Application Data continuation of application No. 15/451,467, filed on Mar. 7, 2017, now Pat. No. 10,042,606.

(60) Provisional application No. 62/330,933, filed on May 3, 2016.

(51) Int. Cl.
  *G06F 7/505* (2006.01)
  *G06F 5/01* (2006.01)
  *G06F 5/16* (2006.01)

(52) U.S. Cl.
  CPC ...... *G06F 7/505* (2013.01); *G06F 2207/3824* (2013.01)

(56) References Cited

U.S. PATENT DOCUMENTS

| | | |
|---|---|---|
| 6,774,669 B1 | 8/2004 | Liu |
| 6,781,408 B1 | 8/2004 | Langhammer |
| 7,109,753 B1 | 9/2006 | Langhammer |
| 7,142,011 B1 | 11/2006 | Langhammer |
| 8,463,835 B1 | 6/2013 | Walke |
| 8,601,044 B2 | 12/2013 | Langhammer |
| 8,886,696 B1 | 11/2014 | Langhammer |
| 9,098,332 B1 | 8/2015 | Langhammer |
| 9,207,908 B1 | 12/2015 | Langhammer |
| 9,348,795 B1 | 5/2016 | Langhammer |
| 9,507,565 B1 | 11/2016 | Streicher et al. |
| 9,904,514 B1 | 2/2018 | Czajkowski |
| 10,042,606 B2 | 8/2018 | Langhammer |
| 2002/0103841 A1* | 8/2002 | Parviainen ............ G06F 7/5306 708/523 |
| 2007/0203964 A1 | 8/2007 | Osada |
| 2010/0250635 A1 | 9/2010 | Osada |
| 2016/0342422 A1 | 11/2016 | Langhammer |

OTHER PUBLICATIONS

Altera Corporation, "Variable Precision DSP Blocks in At-ria 10 Devices," Arria 10 Core Fabric and General Purpose 1/Os Handbook, Chapter 3, v2016.10.3: (Oct. 2016).

Martin Langhammer et al., "Floating-Point DSP Block Architecture for FPGA," Proceedings of the 2015 ACM/SIGDA International Symposium on Field-Programmable Gate Arrays, FPGA '15, Feb. 1, 2015, XP055307796, pp. 117-124.

Extended European Search Report for EP17792982.5 dated Nov. 11, 2019.

* cited by examiner

FIXED-POINT AND FLOATING-POINT ARITHMETIC OPERATOR CIRCUITS IN SPECIALIZED PROCESSING BLOCKS

CROSS REFERENCE TO RELATED APPLICATIONS

This is a continuation of U.S. patent application Ser. No. 16/056,173 filed Aug. 6, 2018, which is a continuation of Ser. No. 15/451,467 filed on Mar. 7, 2017, which issued on Aug. 7, 2018 as U.S. patent Ser. No. 10/042,606, entitled "FIXED-POINT AND FLOATING-POINT ARITHMETIC OPERATOR CIRCUITS IN SPECIALIZED PROCESSING BLOCKS," which claims priority to U.S. Provisional Patent Application No. 62/330,933 filed on May 3, 2016 the entireties of which are herein incorporated by reference for all purposes.

TECHNICAL FIELD

The present embodiments relate to integrated circuits and, more particularly, to fixed-point and floating-point arithmetic operator circuits in specialized processing blocks in an integrated circuit.

BACKGROUND

As applications increase in complexity, it has become more common to include specialized processing blocks in integrated circuits. Such specialized processing blocks may be partly or fully hardwired to perform one or more specific tasks, such as a logical or a mathematical operation. A specialized processing block may also contain one or more specialized structures, such as an array of configurable memory elements.

Examples of structures that are commonly implemented in such specialized processing blocks include: multipliers, adders, accumulators, arithmetic logic units (ALUs), barrel-shifters, various memory elements or storage circuits such as first-in first-out (FIFO) circuits, last-in first-out (LIFO) circuits, serial-in parallel-out (SIPO) shift register circuits, parallel-in serial-out (PISO) shift register circuits, random-access memory (RAM) circuits, read-only memory (ROM) circuits, content-addressable memory (CAM) circuits, register files, logic AND, logic NAND, logic OR, logic NOR arrays, etc., or combinations thereof.

One particularly useful type of specialized processing block, which is sometimes also referred to as a digital signal processing (DSP) block, may be used to process digital signals such as video signals, audio signals, etc. Such blocks are frequently also referred to as multiply-accumulate (MAC) blocks, because they include structures to perform multiplication operations, and sums and/or accumulations of multiplication operations.

Integrated circuits such as programmable integrated circuits often include specialized processing blocks. Each of those specialized processing blocks includes multipliers, adders, and registers, as well as programmable connectors (e.g., multiplexers) that allow the various components of the block to be configured in different ways.

Typically, the arithmetic operators (adders and multipliers) in such specialized processing blocks have been fixed-point operators. If floating-point operators were needed, they would be constructed outside the specialized processing block using general-purpose programmable logic of the device, or using a combination of the fixed-point operators inside the specialized processing block with additional logic in the general-purpose programmable logic.

DETAILED DESCRIPTION

Figure 1:
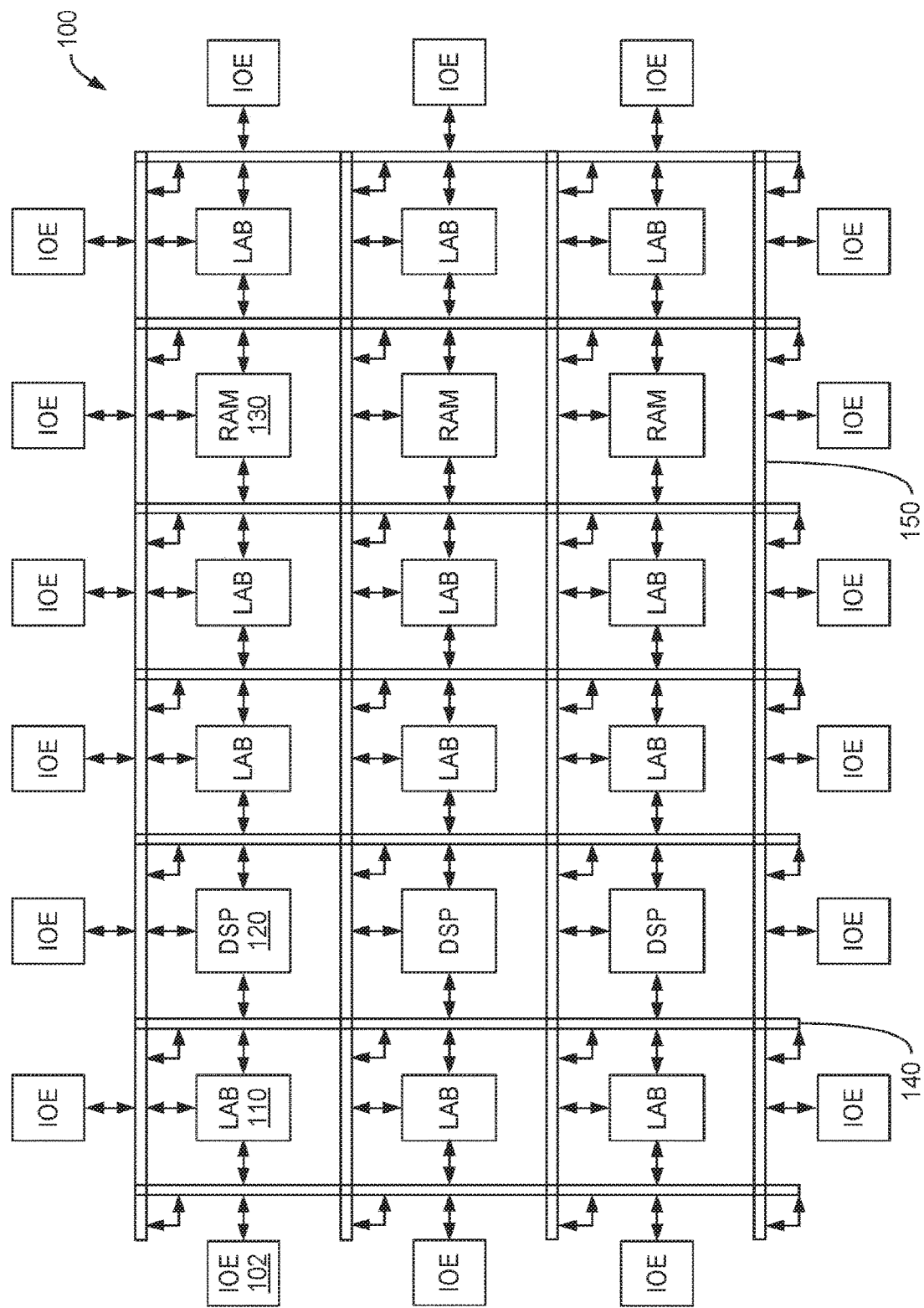
FIG. 1 shows a diagram of an illustrative integrated circuit such as a programmable integrated circuit in accordance with some embodiments.

The present embodiments provided herein relate to integrated circuits and, more particularly, to fixed-point and floating-point arithmetic operator circuits in specialized processing blocks in an integrated circuit.

Floating-point numbers are commonplace for representing real numbers in scientific notation in computing systems and are designed to cover a large numeric range and diverse precision requirements. The IEEE 754 standard, ANSI/IEEE Std. 754-2008, published Aug. 29, 2008, is commonly used for floating-point numbers. A floating-point number includes three different parts: a sign, a mantissa sometimes also referred to as a significant, and an exponent. Each of these parts may be represented by a binary number and, in the format of the IEEE 754 standard, have different bit sizes depending on the precision. For example, a single-precision floating-point number may require 32 bits, which are distributed as follows: one sign bit (bit 31), eight exponent bits (bits [30:23]), and 23 mantissa bits (bits [22:0]). A double-precision floating-point number may require 64 bits including one sign bit (bit 63), 11 exponent bits (bits [62:52]), and 52 mantissa bits (bits [51:0]). A half-precision floating-point number may require 16 bits including one sign bit (bit 15), 5 exponent bits (bits [14:10]), and 10 mantissa bits (bits [9:0]).

According to the IEEE 754 standard, a mantissa may also have additional bits. A mantissa that has additional bits is sometimes also referred to as an extended mantissa. For example, an extended, single-precision mantissa may have five additional bits (i.e., an extended, single-precision mantissa may consist of 28 bits instead of 23 bits). The last three bits added to the right of the least significant bit represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, round and guard bits enable the representation of numbers that are smaller than a mantissa without these additional bits may be able to represent accurately. The sticky bit may record any bits of value '1' that are shifted beyond the precision of the mantissa by performing a logical OR operation with the round and guard bits.

Two bits may be added beyond the most significant bit position, if desired, and may absorb any overflow produced by a floating-point arithmetic operation.

The sign of a floating-point number according to the IEEE 754 standard is represented using a single bit, where a "0" denotes a positive number and a "1" denotes a negative number.

The exponent of a floating-point number preferably is an unsigned binary number which, for the single-precision format, ranges from 0 to 255. In order to represent a very small number, it is necessary to use negative exponents. Thus, the exponent preferably has a negative bias. For single-precision floating-point numbers, the bias preferably is −127. For example, a value of 140 for the exponent actually represents (140−127)=13, and a value of 100 represents (100−127)=−27. For double-precision numbers, the exponent bias preferably is −1023.

As discussed above, according to the IEEE 754 standard, the mantissa is a normalized number (i.e., it has no leading zeros and represents the precision component of a floating-point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

Specialized processing blocks that perform arithmetic operations often include a plurality of multipliers, adders, registers, and programmable connectors (e.g., multiplexers) that allow the various components of the specialized processing block to be configured in different ways. Typically, the arithmetic operators in such specialized processing blocks have been fixed-point operators.

If floating-point operators were needed, they would be constructed outside the specialized processing block (e.g., using additional logic in the integrated circuit, or using a combination of the fixed-point operators inside the specialized processing block with additional logic in the integrated circuit).

However, as applications increase in complexity, the use of floating-point operators has become more common. Consequently, it is desirable to provide a specialized processing block that is adaptable to efficiently implement fixed-point operations and floating-point operations.

It will be recognized by one skilled in the art, that the present exemplary embodiments may be practiced without some or all of these specific details. In other instances, well-known operations have not been described in detail in order not to unnecessarily obscure the present embodiments.

FIG. 1 shows a diagram of an illustrative integrated circuit such as programmable integrated circuit 100 in accordance with some embodiments.

Programmable integrated circuit 100 may have input-output circuitry 102 for driving signals off of programmable integrated circuit 100 and for receiving signals from other devices. Input-output circuitry 102 may include conventional input-output circuitry, serial data transceiver circuitry, differential receiver and transmitter circuitry, or other circuitry used to connect one integrated circuit to another integrated circuit.

As shown, input-output circuitry 102 may be located around the periphery of programmable integrated circuit 100. If desired, programmable integrated circuit 100 may have input-output circuitry 102 arranged in different ways. For example, input-output circuitry 102 may form one or more columns of input-output circuitry that may be located anywhere on the programmable integrated circuit (e.g., distributed evenly across the width of the programmable integrated circuit). If desired, input-output circuitry 102 may form one or more rows of input-output elements (e.g., distributed across the height of the programmable integrated circuit). Alternatively, input-output circuitry 102 may form islands of input-output elements that may be distributed over the surface of the programmable integrated circuit or clustered in selected areas.

Vertical interconnection resources 140 and horizontal interconnection resources 150 such as global and local vertical and horizontal conductive lines and buses may be used to route signals on programmable integrated circuit 100. Vertical and horizontal interconnection resources 140 and 150 include conductive lines and programmable connections between respective conductive lines and are therefore sometimes referred to as programmable interconnects.

Programmable logic regions may include programmable components such as digital signal processing circuitry 120, storage circuitry 130, or other combinational and sequential logic circuitry organized in logic array blocks 110. The programmable logic regions may be configured to perform a custom logic function. If desired, the programmable logic region may include digital signal processing circuitry 120 and storage circuitry 130 which both may be organized in specialized blocks that have limited configurability. The programmable logic region may include additional specialized blocks such as programmable phase-locked loop circuitry, programmable delay-locked loop circuitry, or other specialized blocks with limited configurability.

Programmable integrated circuit 100 may include programmable memory elements. These memory elements can be loaded with configuration data (sometimes also referred to as programming data) using input-output circuitry 102. Once loaded, the memory elements each provide a corresponding static control signal that controls the operation of an associated logic component in a programmable logic region. In a typical scenario, the outputs of the loaded memory elements are applied to the gates of transistors in the programmable logic region to turn certain transistors on or off and thereby configure the logic and the routing paths in the programmable logic region. Programmable logic circuit elements that may be controlled in this way include parts of multiplexers (e.g., multiplexers used for forming routing paths in programmable interconnects), look-up tables, logic arrays, XOR, AND, OR, NAND, and NOR logic gates, pass gates, inverters, etc.

Memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements are loaded with configuration data during programming, memory elements are sometimes referred to as configuration memory, configuration RAM, or programmable memory elements.

The circuitry of programmable integrated circuit 100 may be organized using any suitable architecture. As an example, the logic of programmable integrated circuit 100 may be organized in a series of rows and columns of larger programmable logic regions each of which contains multiple smaller logic regions.

The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMS). Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) containing multiple logic elements or multiple ALMS.

During device programming, configuration data is loaded into programmable integrated circuit 100 that configures the programmable logic regions so that their logic resources perform desired logic functions.

Figure 2:
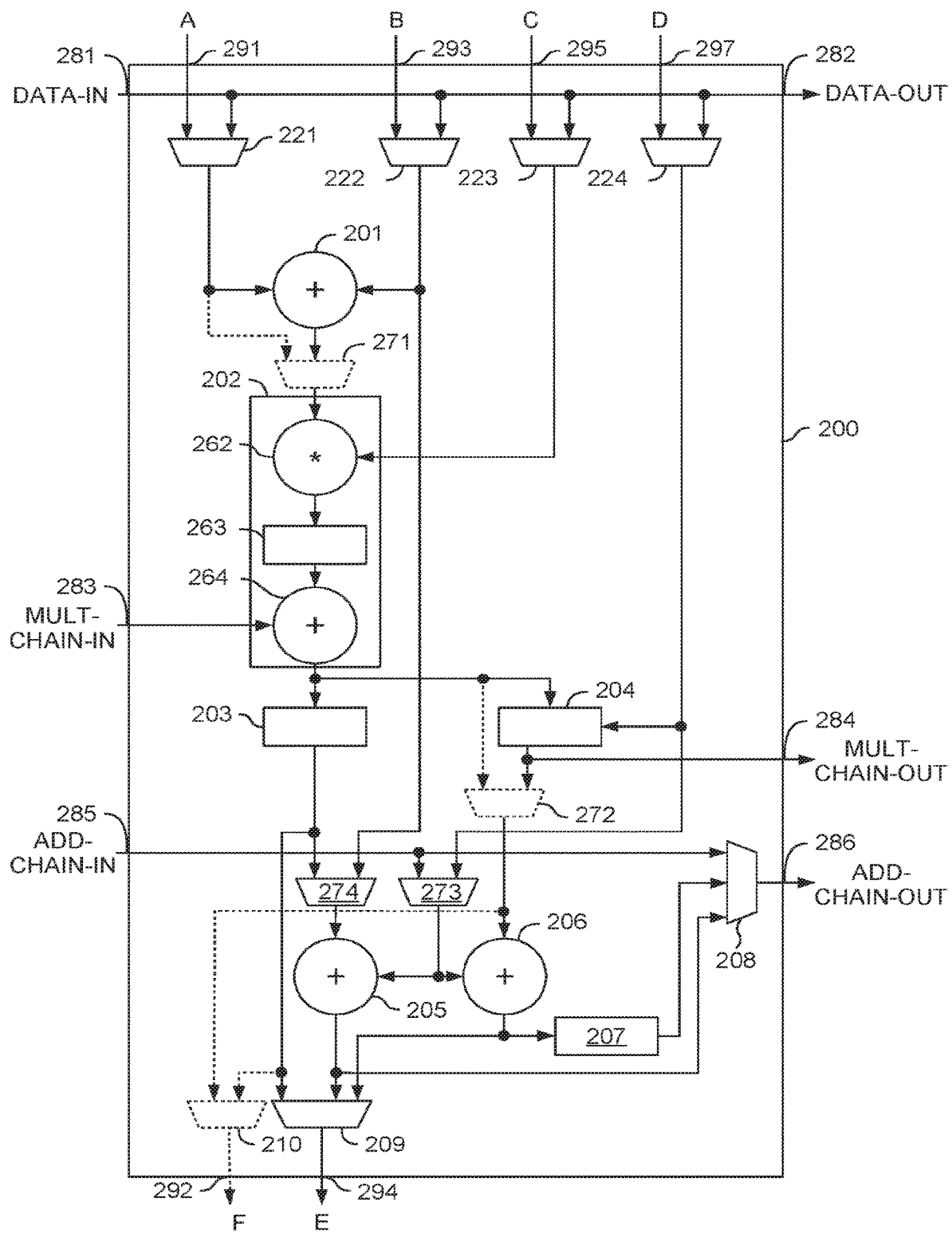
FIG. 2 is a diagram of an illustrative specialized processing block for performing fixed-point and/or floating-point operations in accordance with some embodiments.

An illustrative embodiment of a specialized processing block 200 that is adaptable to efficiently implement fixed-point arithmetic operations and/or floating-point arithmetic operations is shown in FIG. 2.

In this logical representation, implementation details, such as registers and some programmable routing features, such as multiplexers and routes that may allow the output of a particular structure to be routed around certain components or directly out of the specialized processing block, are omitted to simplify discussion. In addition, some elements that are shown may, in an actual embodiment, be implemented more than once. For example, multiplier 202 may actually represent two or more multipliers. As shown, specialized processing block 200 includes input ports 291, 293, 295, and 297, output ports 292 and 294, chain-in ports 281, 283, and 285, chain-out ports 282, 284, and 286, multiplexers 221, 222, 223, 224, 208, 209, 210, 271, 272, 273, and 274, pre-adder circuit 201, arithmetic operator circuit 202, floating-point rounding circuit 203, logic circuit block 204, floating-point adder circuit 205, fixed-point adder circuit 206, and shifter circuit 207. As shown, arithmetic operator circuit 202 may include multiplier circuit 262, additional shifter circuit 263, and additional fixed-point adder circuit 264.

Multiplier circuit 262 may be a fixed-point multiplier circuit that implements a fixed-point multiplication operation. If desired, multiplier circuit 262 may be a floating-point multiplier circuit that implements a floating-point multiplication operation. In some embodiments, multiplier circuit 262 may be configurable to select between performing a floating-point multiplication operations or a fixed-point multiplication operation.

Specialized processing block 200 may produce output signals at output ports 292 and 294 and receive input signals at input ports 291, 293, 295, and 297. If desired, specialized processing block 200 may be arranged in a cascade chain with other specialized processing blocks (e.g., in a row or a column) and receive additional input signals from an adjacent specialized processing block via direct connections at chain-in ports 281, 283, and 285 and provide additional output signals from chain-out ports 282, 284, and 286 via other direct connections to another adjacent specialized processing block.

Configurable interconnect circuitry in specialized processing block 200 may route signals between input ports 291, 293, 295, and 297, output ports 292 and 294, chain-in ports 281, 283, and 285, chain-out ports 282, 284, and 286, pre-adder circuit 201, arithmetic operator circuit 202, floating-point rounding circuit 203, logic circuit block 204, floating-point adder circuit 205, fixed-point adder circuit 206, shifter circuit 207, multiplier circuit 262, additional shifter circuit 263, and additional fixed-point adder circuit 264.

As shown, configurable interconnect circuitry may include multiplexers 221, 222, 223, 224, 208, 209, 210, 271, 272, 273, and 274, and interconnections, which are sometimes also referred to as routing tracks.

Control signals may control the selection performed by multiplexers 221, 222, 223, 224, 208, 209, 210, 271, 272, 273, and 274. The control signals may be generated by logic circuits that dynamically control the selection of the respective multiplexers and/or stored in storage circuits. The logic circuits and/or storage circuits may be located inside specialized processing block 200. If desired, some or all of the logic circuits and/or storage circuits may be located outside of specialized processing block 200 and the control signals may be provided to the respective multiplexers through additional input ports.

The control signals may be stored individually for each multiplexer or in groups for multiple multiplexers. The storage circuits may load the control signals during configuration or reconfiguration of specialized processing block 200. In some embodiments, the storage circuits may be programmable memory elements of an integrated circuit (e.g., programmable integrated circuit 100 of FIG. 1).

For example, multiplexer 209 may select between routing a product signal received from floating-point rounding circuit 203, a floating-point sum signal received from floating-point adder circuit 205, and a fixed-point sum signal received from fixed-point adder circuit 206 to output port 294. Multiplexer 210 may select between routing a product signal received from floating-point rounding circuit 203 and a selected signal of a fixed-point product signal received from arithmetic operator circuit 202 and a logic function output signal received from logic circuit block 204 to output port 294. In some embodiments, output ports 292 and 294 may be combined into a single output port. In these embodiments, multiplexers 209 and 210 may be combined into a single multiplexer.

As another example, multiplexer 208 may select between routing a chain-in signal (e.g., signal ADD_CHAIN_IN)

received from chain-in port 285, a floating-point sum signal received from floating-point adder circuit 205, and a shifted fixed-point sum signal received from shifter circuit 207 as a chain-out signal (e.g., signal ADD_CHAIN_OUT) to chain-out port 286.

In the logical representation of FIG. 2, specialized processing block 200 may implement a fixed-point addition, a floating-point addition, a fixed-point multiplication with or without a prior addition, a floating-point multiplication with or without a prior addition, or combinations thereof, a portion of a higher-precision floating-point operation when implementing a higher-precision floating-point operation together with additional circuitry (e.g., with other specialized processing blocks or with additional logic circuitry such as logic array block 110 of programmable integrated circuit 100 of FIG. 1), etc.

Consider the scenario in which specialized processing block 200 receives input signals A, B, C, and D at input ports 291, 293, 295, and 297, respectively, and chain-in signals DATA_IN, MULT_CHAIN_IN, and ADD_CHAIN_IN at chain-in ports 281, 283, and 285, respectively. In this scenario, multiplexers 221, 222, 223, and 224 may select between input signals A and DATA_IN, between B and DATA_IN, between C and DATA_IN, and between D and DATA_IN, respectively.

The configurable interconnect circuitry may route a first selected signal from multiplexer 222 to pre-adder circuit 201 and multiplexer 274, and the configurable interconnect circuitry may route a second selected signal from multiplexer 221 to pre-adder circuit 201 and optional multiplexer 271. Pre-adder circuit 201 may generate a first sum signal by adding first and second selected signals and provide the first sum signal to multiplexer 271.

Multiplexer 271 of the configurable interconnect circuitry may select between the first sum signal and the second selected signal, and the configurable interconnect circuitry may route the selected signal as first multiplicand signal from multiplexer 271 to multiplier circuit 262 in arithmetic operator circuit 202. Selecting the second selected signal in multiplexer 271 implies bypassing pre-adder circuit 201. If desired, multiplexer 271 may be omitted and the second selected signal may be provided to multiplier circuit 262 by providing zero as the first selected signal.

Configurable interconnect circuitry may route the output of multiplexer 223 as a second multiplicand signal to multiplier circuit 262 in arithmetic operator circuit 202. Multiplier circuit 262 may generate a product signal based on the first and second multiplicand signals. If desired, shifter circuit 263 may generate a shifted product signal by shifting the product signal from multiplier circuit 262 by a predetermined number of bits in a predetermined direction, which may be to the left or to the right.

The predetermined number and/or the predetermined direction may be generated by logic circuits that dynamically control the shift operation and/or stored in storage circuits. The logic circuits and/or storage circuits may be located inside specialized processing block 200 and/or outside of specialized processing block 200 and provided to shifter circuit 263 through additional input ports.

In some embodiments, the product signal may not be shifted by providing zero as the predetermined number. In other embodiments, arithmetic operator circuit 202 may include an additional multiplexer that may enable a bypass path around shifter circuit 263.

If desired, the shifted product signal may be added to the MULT_CHAIN_IN signal from chain-in port 283 in additional fixed-point adder circuit 264 to generate an arithmetic operator circuit output signal. In some embodiments, zero may be added to the shifted product signal. In other embodiments, arithmetic operator circuit 202 may include an additional multiplexer that enables a bypass path around additional fixed-point adder circuit 264.

Configurable interconnect circuitry may convey the arithmetic operator circuit output signal to floating-point rounding circuit 203 and logic circuit block 204.

Floating-point rounding circuit 203 may perform a rounding operation of the arithmetic operator circuit output signal received from arithmetic operator circuit 202 based on a predetermined rounding scheme. The rounding scheme may be any rounding scheme that is suitable for rounding a floating-point number, such as round to zero which is sometimes also referred to as truncation, round down, round up, round to nearest number, round to nearest even, just to name a few.

If desired, floating-point rounding circuit 203 may perform a normalization operation. The normalization operation may include shifting the mantissa of the arithmetic operator circuit output signal to restore a '1' as the leading bit as required by the IEEE 754 standard and increment or decrement the corresponding exponent of the arithmetic operator circuit output signal accordingly.

For example, the normalization operation may shift the mantissa of the arithmetic operator circuit output signal N bit positions to the right and increment the exponent of the arithmetic operator circuit output signal by N with N being an integer number. In another example, the normalization operation may shift the mantissa of the arithmetic operator circuit output signal N bit positions to the left and decrement the exponent of the arithmetic operator circuit output signal by N.

If desired, an exponent handling circuit inside of specialized processing block 200 may perform the adjustment of the exponent caused by rounding and normalization operations.

In some embodiments, specialized processing block 200 may execute only one rounding scheme that has been predetermined during manufacturing of the specialized processing block. In other embodiments, the predetermined rounding scheme may be selected among a variety of rounding schemes. For example, the predetermined rounding scheme may be selected using a control signal. If desired, a storage circuit may store the control signal (e.g., in a programmable memory element that is loaded during configuration of specialized processing block 200). Logic circuit block 204 may perform a logical operation. If desired, logic circuit block 204 may perform any unary logical operation on the arithmetic operator circuit output signal received from arithmetic operator circuit 202. For example, the logic circuit block 204 may perform an inversion operation or an identity operation, just to name a few. If desired, logic circuit block 204 may perform any binary logical operation on the arithmetic operator circuit output signal and the selected signal from multiplexer 224. For example, logic circuit block 204 may perform a logical AND operation, a logical NAND operation, a logical OR operation, a logical NOR operation, a logical XOR operation, a logical XNOR operation, a left-shift operation, or a right-shift operation, just to name a few.

In some embodiments, logic circuit block 204 may execute only one logical operation that has been predetermined during manufacturing of the specialized processing block. In other embodiments, the logical operation may be selected among a variety of logical operations. For example, the logical operation may be selected using a control signal.

If desired, a storage circuit may store the control signal that configures logic circuit block 204 (e.g., in a programmable memory element that is loaded during configuration of specialized processing block 200). If desired, a look-up table (LUT) may implement logic circuit block 204.

If desired, an output signal from logic circuit block 204 may be provided as MULT_CHAIN_OUT signal to chain-out port 284 and to multiplexer 272.

Multiplexer 272 of the configurable interconnect circuitry may select between the output signal from logic circuit block 204 and the arithmetic operator circuit output signal, and the configurable interconnect circuitry may route the selected signal as a summand signal from multiplexer 272 to fixed-point adder circuit 206. Selecting the arithmetic operator circuit output signal in multiplexer 272 implies bypassing logic circuit block 204. If desired, multiplexer 272 may be omitted and the arithmetic operator circuit output signal provided to fixed-point adder circuit 206 by selecting, for example, the identity function, a logical AND with "one", or a logical OR with "zero" in logic circuit block 204.

Multiplexer 273 of the configurable interconnect circuitry may select between the ADD_CHAIN_IN signal from chain-in port 285 and the selected signal from multiplexer 224, and the configurable interconnect circuitry may route the selected signal as a summand signal from multiplexer 273 to fixed-point adder circuit 206 and to floating-point adder circuit 205.

Multiplexer 274 of the configurable interconnect circuitry may select between the second selected signal from multiplexer 222 and the rounded floating-point signal from floating-point rounding circuit 203, and the configurable interconnect circuitry may route the selected signal as a summand signal to floating-point adder circuit 205.

Thus, based on the configuration of the configurable interconnect circuitry, fixed-point adder circuit 206 may generate a fixed-point sum signal of the selected signal from multiplexer 224 and the arithmetic operator circuit output signal from arithmetic operator circuit 202, of the selected signal from multiplexer 224 and the output signal from logic circuit block 204, of the ADD_CHAIN_IN signal from chain-in port 285 and the arithmetic operator circuit output signal, or of the ADD_CHAIN_IN signal and the output signal from logic circuit block 204.

Similarly, based on the configuration of the configurable interconnect circuitry, floating-point adder circuit 205 may generate a floating-point sum signal of the selected signal from multiplexer 224 and the second selected signal from multiplexer 222, of the selected signal from multiplexer 224 and the rounded floating-point signal from floating-point rounding circuit 203, of the ADD_CHAIN_IN signal from chain-in port 285 and the second selected signal, or of the ADD_CHAIN_IN signal and the rounded floating-point signal.

The configurable interconnect circuitry may convey the floating-point sum signal to multiplexers 208 and 209 and the fixed-point sum signal to shifter circuit 207 and multiplexer 209. Shifter circuit 207 may generate a shifted fixed-point sum signal by shifting the fixed-point sum signal by a predetermined number of bits to the left or to the right.

The predetermined number and/or the direction may be generated by logic circuits that dynamically control the shift operation. If desired, the predetermined number and/or the direction of the shift operation may be stored in storage circuits that statically control the shift operation. The logic circuits and/or storage circuits may be located inside specialized processing block 200 and/or outside of specialized processing block 200, whereby the predetermined number may be provided to shifter circuit 207 through additional input ports.

In some embodiments, the fixed-point sum signal may not be shifted by providing zero as the predetermined number. In other embodiments, specialized processing block 200 may include a bypass path from fixed-point adder circuit 206 around shifter circuit 207 to multiplexer 208.

As shown, multiplexer 208 of the configurable interconnect circuitry may select between the shifted fixed-point signal from shifter circuit 207, the floating-point sum signal from floating-point adder circuit 205, and the ADD_CHAIN_IN signal from chain-in port 285, and the configurable interconnect circuitry may route the selected signal as ADD_CHAIN_OUT signal to chain-out port 286.

Multiplexer 209 of the configurable interconnect circuitry may select between the fixed-point sum signal from fixed-point adder circuit 206, the floating-point sum signal from floating-point adder circuit 205, and the rounded floating-point signal from floating-point rounding circuit 203, and the configurable interconnect circuitry may route the selected signal as signal E to output port 294.

If desired, multiplexer 210 of the configurable interconnect circuitry may select between the output signal from logic circuit block 204 and the arithmetic operator circuit output signal from arithmetic operator circuit 202, and the rounded floating-point signal from floating-point rounding circuit 203, and the configurable interconnect circuitry may route the selected signal as signal F to output port 292. In certain embodiments, specialized processing block 200 may implement additional features. For example, specialized processing block 200 may include a path from the output of multiplexer 209 through a register to an additional input of multiplexer 273, thereby enabling the implementation of a floating-point accumulation or a fixed-point accumulation, if desired.

Based on the configuration of the configurable interconnect circuitry, specialized processing block 200 may implement different arithmetic operations as described above. FIG. 3A is a diagram of an illustrative specialized processing block such as specialized processing block 200 of FIG. 2 that is configured to perform a floating-point multiply-add operation using a cascade chain-in port in accordance with some embodiments.

As shown, specialized processing block 300A may include arithmetic operator circuit 302 that may be configured to implement a floating-point multiplication or a fixed-point multiplication, floating-point rounding circuit 312, floating-point adder circuit 313, and configurable interconnect circuitry that may include multiplexers 321, 322, 323, and 324 and routing tracks in specialized processing block 300A.

Specialized processing block 300A may receive input signals A, B, C, and D at input ports and chain-in signals DATA_IN and ADD_CHAIN_IN at chain-in ports. If desired, signals DATA_IN, A, B, C, and D may be floating-point numbers or portions of floating-point numbers (e.g., mantissas and/or exponents of floating-point numbers).

Multiplexers 321, 322, 323, and 324 of the configurable interconnect circuitry may select between input signals A and DATA_IN, between B and DATA_IN, between C and DATA_IN, and between D and DATA_IN, respectively, and route the output of multiplexers 321 and 323 as first and second multiplicand signals to arithmetic operator circuit 302. Arithmetic operator circuit 302 may generate a floating-point product signal based on the first and second multiplicand signals, and configurable interconnect circuitry may convey the floating-point product signal to floating-point rounding circuit 312.

Floating-point rounding circuit 312 may perform a rounding operation of the floating-point product signal received from arithmetic operator circuit 302 based on a predetermined rounding scheme. The rounding scheme may be any rounding scheme that is suitable for rounding a floating-point number, such as round to zero which is sometimes also referred to as truncation, round down, round up, round to nearest number, round to nearest even, just to name a few.

If desired, floating-point rounding circuit 312 may perform a normalization operation. The normalization operation may include shifting the mantissa of the floating-point product signal to restore a '1' as the leading bit as required by the IEEE 754 standard and increment or decrement the exponent of the floating-point product signal accordingly. For example, the normalization operation may shift the mantissa of the floating-point product signal N bit positions to the right and increment the exponent of the floating-point product signal by N with N being an integer number. In another example, the normalization operation may shift the mantissa of the floating-point product signal N bit positions to the left and decrement the exponent of the floating-point product signal by N.

In some embodiments, specialized processing block 300A may execute only one rounding scheme that has been predetermined during manufacturing of the specialized processing block. In other embodiments, the predetermined rounding scheme may be selected among a variety of rounding schemes. For example, the predetermined rounding scheme may be selected using a control signal. If desired, a storage circuit may store the control signal (e.g., in a programmable memory element that is loaded during configuration of specialized processing block 300A).

Floating-point adder circuit 313 may receive the rounded floating-point signal from floating-point rounding circuit 312 and the ADD_CHAIN_IN signal from the chain-in port, generate a floating-point sum signal based on the received signals, and provide the floating-point sum signal (e.g., via configurable interconnect circuitry) as signal E at an output port and/or as signal ADD_CHAIN_OUT at a chain-out port.

Figure 3B:
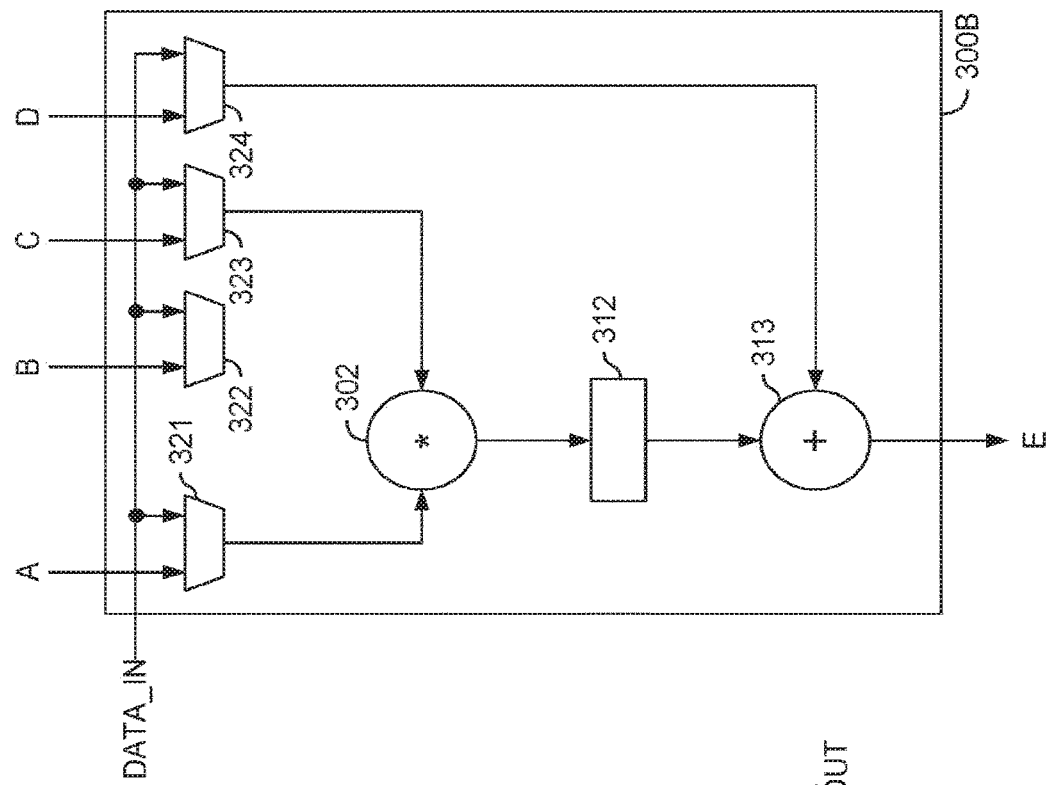
FIG. 3B is a diagram of an illustrative specialized processing block that is configured to perform a floating-point multiply-add operation using an input port in accordance with some embodiments.
Figure 3A:
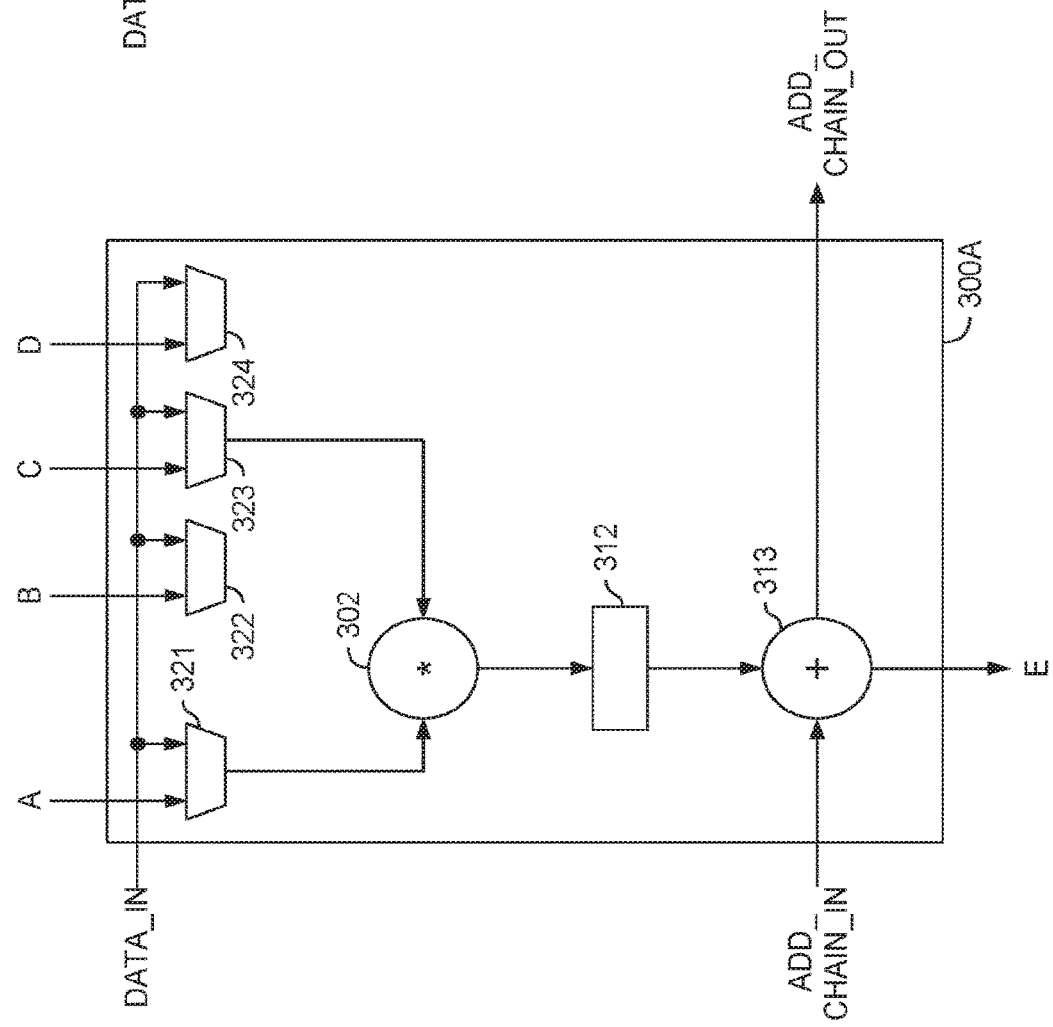
FIG. 3A is a diagram of an illustrative specialized processing block that is configured to perform a floating-point multiply-add operation using a cascade chain-in port in accordance with some embodiments.

FIG. 3B is a diagram of an illustrative specialized processing block such as specialized processing block 200 of FIG. 2 that is configured to perform a floating-point multiply-add operation using an input port in accordance with some embodiments.

As shown, specialized processing block 300B may include arithmetic operator circuit 302 that may be configured to implement a floating-point multiplication or a fixed-point multiplication, floating-point rounding circuit 312, floating-point adder circuit 313, and configurable interconnect circuitry that may include multiplexers 321, 322, 323, and 324 and routing tracks in specialized processing block 300B.

Specialized processing block 300B may receive input signals A, B, C, and D at input ports and chain-in signal DATA_IN at a chain-in port. If desired, signals DATA_IN, A, B, C, and D may be floating-point numbers or portions of floating-point numbers (e.g., mantissas and/or exponents of floating-point numbers).

Multiplexers 321, 322, 323, and 324 of the configurable interconnect circuitry may select between input signals A and DATA_IN, between B and DATA_IN, between C and DATA_IN, and between D and DATA_IN, respectively, and route the output of multiplexers 321 and 323 as first and second multiplicand signals to arithmetic operator circuit 302. Arithmetic operator circuit 302 may generate a floating-point product signal based on the first and second multiplicand signals, and configurable interconnect circuitry may convey the floating-point product signal to floating-point rounding circuit 312.

Floating-point rounding circuit 312 may perform a rounding operation on the floating-point product signal received from arithmetic operator circuit 302 based on a predetermined rounding scheme. The rounding scheme may be any rounding scheme that is suitable for rounding a floating-point number, such as round to zero which is sometimes also referred to as truncation, round down, round up, round to nearest number, round to nearest even, just to name a few.

In some embodiments, specialized processing block 300B may execute only one rounding scheme that has been predetermined during manufacturing of the specialized processing block. In other embodiments, the predetermined rounding scheme may be selected among a variety of rounding schemes. For example, the predetermined rounding scheme may be selected using a control signal. If desired, a storage circuit may store the control signal (e.g., in a programmable memory element that is loaded during configuration of specialized processing block 300B). Floating-point adder circuit 313 may receive the rounded floating-point signal from floating-point rounding circuit 312 and a selected signal from multiplexer 324, generate a floating-point sum signal based on the received signals, and provide the floating-point sum signal (e.g., via configurable interconnect circuitry) as signal E at an output port and/or as signal ADD_CHAIN_OUT at a chain-out port.

Figure 4:
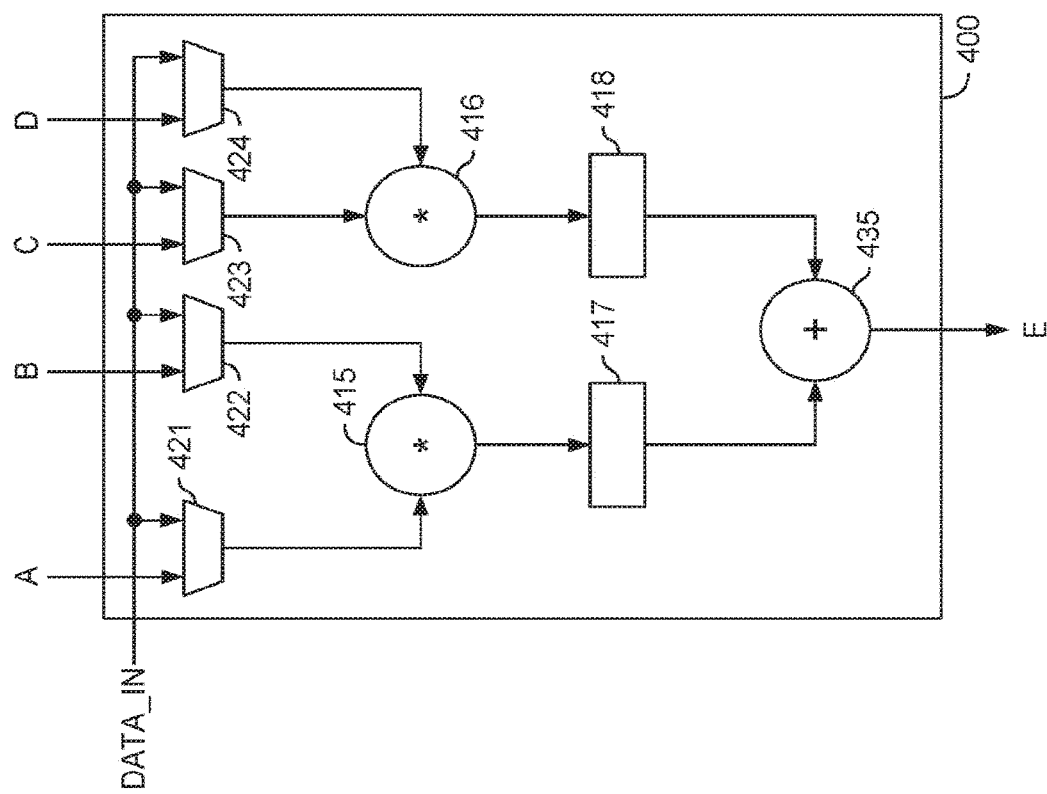
FIG. 4 is a diagram of an illustrative specialized processing block that generates a floating-point sum of two floating-point products in accordance with some embodiments.

FIG. 4 is a diagram of an illustrative specialized processing block (e.g., specialized processing block 200 of FIG. 2) that generates a floating-point sum of two floating-point products in accordance with some embodiments.

As shown, specialized processing block 400 may include arithmetic operator circuits 415 and 416 that may be configured to implement each a floating-point multiplication, floating-point rounding circuits 417 and 418, floating-point adder circuit 435, and configurable interconnect circuitry that may include multiplexers 421, 422, 423, and 424 and routing tracks in specialized processing block 400.

In some embodiments, arithmetic operator circuits 415 and 416 may be implemented by arithmetic operator circuit 202 of FIG. 2 that is decomposed into two arithmetic operator circuits that can implement two floating-point arithmetic operations independently. For example, a portion of the arithmetic operator circuit may include an 18×18 fixed-point multiplier that may be decomposed into two 9×9 fixed-point multipliers. In other cases, larger multipliers may be composed of smaller multipliers. As an example, four 18×18 multipliers may be combined to make one 36×36 multiplier. As another example, two 18×18 multipliers may be combined to make one 27×27 multiplier, but one of the 18×18 multipliers may itself be composed of a 18×9 and a 27×9 multiplier.

In some scenarios, specialized processing block 400 may be configured to implement fixed-point operations as well as the addition of two half-precision floating-point multiplications, two half-precision floating-point multiplications, a half-precision floating-point multiply-add operation, a portion of a single-precision floating-point multiplication operation, or a portion of a single-precision floating-point multiply-add operation. In these scenarios, specialized processing block 400 may include an M×N multiplier circuit that is decomposed into two K×L multiplier circuits with K smaller than or equal to M and L smaller than or equal to N.

For example, an 18×22 multiplier circuit may be decomposed into two 18×11 multiplier circuits or an 18×25 multiplier may be decomposed into two 18×12 multipliers circuits.

Specialized processing block 400 may receive input signals A, B, C, and D at input ports and chain-in signal DATA_IN at a chain-in port. If desired, signals DATA_IN, A, B, C, and D may be floating-point numbers or portions of floating-point numbers.

Multiplexers 421, 422, 423, and 424 of the configurable interconnect circuitry may select between input signals A and DATA_IN, between B and DATA_IN, between C and DATA_IN, and between D and DATA_IN, respectively, and route the outputs of multiplexers 421 and 422 as first and second multiplicand signals to arithmetic operator circuit 415 and the outputs of multiplexers 423 and 424 as third and fourth multiplicand signals to arithmetic operator circuit 416.

Arithmetic operator circuit 415 may generate a first floating-point product signal based on the first and second multiplicand signals, and configurable interconnect circuitry may convey the first floating-point product signal to floating-point rounding circuit 417. Arithmetic operator circuit 416 may generate a second floating-point product signal based on the third and fourth multiplicand signals, and configurable interconnect circuitry may convey the second floating-point product signal to floating-point rounding circuit 418.

Floating-point rounding circuits 417 and 418 may perform a rounding operation of the first and second floating-point product signals based on a predetermined rounding scheme, respectively. The rounding scheme may be any rounding scheme that is suitable for rounding a floating-point number, such as round to zero which is sometimes also referred to as truncation, round down, round up, round to nearest number, round to nearest even, just to name a few.

If desired, floating-point rounding circuits 417 and 418 may each perform a normalization operation. The normalization operation may include shifting the mantissas of the first and second floating-point product signals to restore a '1' as the leading bit as required by the IEEE 754 standard and increment or decrement the respective exponent of the first and second floating-point product signals accordingly.

In some embodiments, floating-point rounding circuits 417 and 418 may not perform a normalization operation and provide non-normalized rounded floating-point signals to floating-point adder circuit 435.

Floating-point adder circuit 435 may receive the rounded floating-point signals from floating-point rounding circuits 417 and 418, generate a floating-point sum signal based on the received signals, and provide the floating-point sum signal (e.g., via configurable interconnect circuitry) as signal E at an output port.

Figure 5:
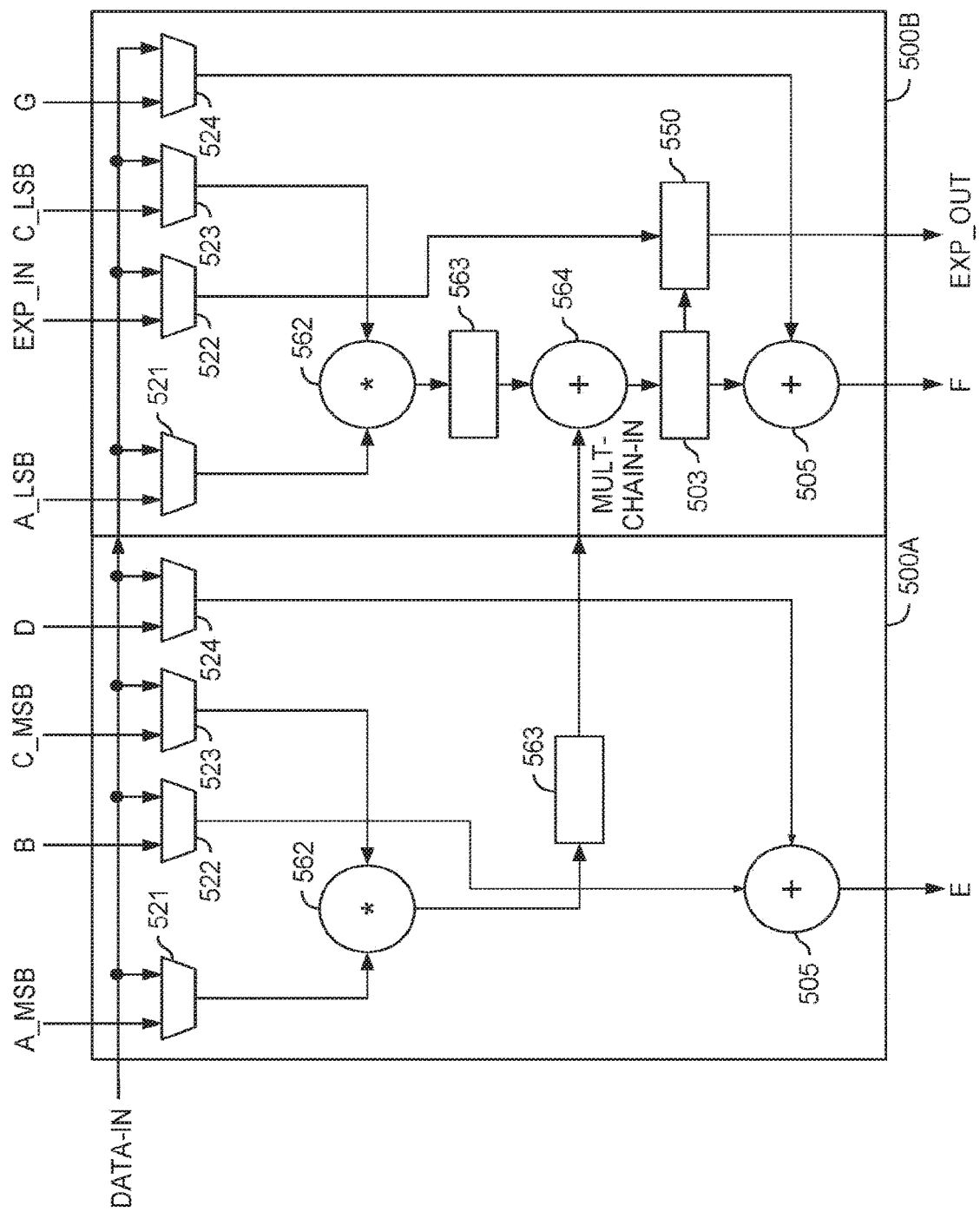
FIG. 5 is a diagram of two illustrative specialized processing blocks that are arranged in a cascade chain and perform together a single-precision floating-point multiply-add operation and an additional floating-point addition in accordance with some embodiments.

If desired, two adjacent specialized processing blocks such as two instances of specialized processing block 200 of FIG. 2 may be combined to implement a larger precision floating-point operation. As an example, a specialized processing block with an 18×25 bit multiplier circuit may be combined with another specialized processing block having another 18×25 bit multiplier circuit to implement a 25×25 bit multiplication operation as required for single-precision floating-point multiplication operations. FIG. 5 is a diagram of two illustrative specialized processing blocks 500A and 500B that are arranged in a cascade chain and perform together a single-precision floating-point multiply-add operation and an additional floating-point addition in accordance with some embodiments.

If desired, specialized processing block 500A may have a first chain-out port that conveys signal DATA_IN over a first cascade connection, which is sometimes also referred to as an interblock connection, to a first chain-in port of specialized processing block 500B. Specialized processing block 500A may have a second chain-out port that conveys signal MULT_CHAIN_IN via a second cascade connection to a second chain-in port of specialized processing block 500B.

As shown, specialized processing blocks 500A and 500B may each include multiplier circuit 562, shifter circuit 563, floating-point adder circuit 505, and configurable interconnect circuitry that may include multiplexers 521, 522, 523, and 524 and routing tracks.

Multiplier circuit 562 may be a fixed-point multiplier circuit that implements a fixed-point multiplication operation. If desired, multiplier circuit 562 may be a floating-point multiplier circuit that implements a floating-point multiplication operation. In some embodiments, multiplier circuit 562 may be configurable to select between performing a floating-point multiplication operations or a fixed-point multiplication operation.

Specialized processing block 500B may further include fixed-point adder circuit 564, floating-point rounding circuit 503, and exponent handling circuit 550. If desired, specialized processing blocks 500A and 500B may be identical. In other words, specialized processing block 500A may also include a fixed-point adder circuit 564, floating-point rounding circuit 503, and exponent handling circuit 550.

Specialized processing blocks 500A and 500B may receive input signals A, B, C, D, G, and EXP_IN at input ports and chain-in signal DATA_IN at a chain-in port. If desired, signals DATA_IN, A, B, C, D, and G may be floating-point numbers or portions of floating-point numbers. In some scenarios, DATA_IN, A, B, C, D, and G may represent mantissas of floating-point numbers.

As an example, consider the scenario in which G is a single-precision floating-point number having at least a mantissa and an exponent, and EXP_IN has information about the exponents of single-precision floating point numbers A and C. For example, EXP_IN may be a concatenation of the exponents of A and C. As another example, specialized processing block 500B may have two exponent inputs, one for the exponent of A and another for the exponent of C.

If desired, exponent handling circuit 550 may determine the exponent of the floating-point multiplication operation using the respective exponents of A and C. For example, exponent handling circuit 550 may generate the sum of the respective exponents of A and C and add the absolute value of the single-precision floating-point bias (i.e., +127) to account for the fact that the respective exponents of A and C are both biased.

In some embodiments, additional circuitry outside of specialized processing blocks 500A and 500B may determine a partial exponent result of the floating-point multiplication operation (i.e., the exponent result without having performed normalization of the mantissa multiplication portion). In these embodiments, EXP_IN may represent the partial exponent result and exponent handling circuit 550 may increment or decrement EXP_IN during normalization of the mantissa result of the floating-point multiplication operation to determine the final exponent result.

Consider further that A, B, C, and D are mantissas of single-precision floating-point numbers (i.e., include 23 bits). If desired, at least one of A, B, C, and D may be an extended mantissa of a single-precision floating-point number (i.e., include more than 23 bits). Consider further that A_MSB and A_LSB are portions of mantissa A and that C_MSB and C_LSB are portions of mantissa C.

The portions of mantissa A and the portions of mantissa C may be distinct. If desired, the portions of mantissa A (i.e., A_MSB and A_LSB) and/or the portions of mantissa C (i.e., C_MSB and C_LSB) may overlap at least partially. In some embodiments, the portions of mantissa A (i.e., A_MSB and A_LSB) and/or the portions of mantissa C (i.e., C_MSB and C_LSB) may be identical.

For example, A_MSB, A_LSB, C_MSB, and C_LSB may be A[22:0], A[22:0], C[22:12], C[11:0], respectively. In another example, A_MSB, A_LSB, C_MSB, and C_LSB may be A[24:13], A[12:0], C[24:0], C[24:0], respectively.

In this scenario, specialized processing block 500A may receive signals A_MSB, C_MSB, B, and D, and multiplexers 521, 522, 523, and 524 of the configurable interconnect circuitry may select input signals A_MSB, B, C_MSB, and D, respectively, and route the output of multiplexers 521 and 523 as first and second multiplicand signals to multiplier circuit 562 and the output of multiplexers 522 and 524 as first and second summand signals to floating-point adder circuit 505.

Floating-point adder circuit 505 of specialized processing block 500A may generate a floating-point sum signal based on the first and second summand signals, and configurable interconnect circuitry may convey the floating-point sum signal as signal E to an output port of specialized processing block 500A.

Multiplier circuit 562 of specialized processing block 500A may generate a floating-point product signal based on the first and second multiplicand signals, and configurable interconnect circuitry may convey the floating-point product signal to shifter circuit 563. In the scenario above in which the first and second multiplicand signals are portions of floating-point mantissas A and C (i.e., A_MSB and C_MSB), respectively, multiplier circuit 562 may be configured to perform a fixed-point multiplication operation of the first and second multiplicand signals, and the floating-point product signal may be a floating-point mantissa or a portion of a floating-point mantissa.

Shifter circuit 563 may shift the floating-point product signal by a predetermined number of bits to the left or to the right. For example, the floating-point product signal may not be shifted. Configurable interconnect circuitry may route the shifted floating-point product signal to a chain-out port of specialized processing block 500A.

Specialized processing block 500B may receive signals A_LSB, C_LSB, EXP_IN, and G, and multiplexers 521, 522, 523, and 524 of the configurable interconnect circuitry of specialized processing block 500B may select input signals A_LSB, EXP_IN, C_LSB, and G, respectively, and route the output of multiplexers 521 and 523 as third and fourth multiplicand signals to multiplier circuit 562, the output of multiplexer 522 to exponent handling circuit 550, and the output of multiplexer 524 as a first summand signal to floating-point adder circuit 505.

Multiplier circuit 562 of specialized processing block 500B may generate another floating-point product signal based on the third and fourth multiplicand signals, and configurable interconnect circuitry may convey the other floating-point product signal to shifter circuit 563. In the scenario above in which the third and fourth multiplicand signals are portions of floating-point mantissas A and C (i.e., A_LSB and C_LSB), respectively, multiplier circuit 562 may be configured to perform a fixed-point multiplication operation of the third and fourth multiplicand signals, and the other floating-point product signal may be a floating-point mantissa or a portion of a floating-point mantissa.

Shifter circuit 563 of specialized processing block 500B may shift the other floating-point product signal a predetermined number of bits to the left or to the right. As an example, the other floating-point product signal may not be shifted. If desired, the shift operation performed by shifter circuit 563 of specialized processing block 500B may depend on the shift operation performed by shifter circuit 563 of specialized processing block 500A. For example, the floating-point product signal may be shifted by shifter circuit 563 of specialized processing block 500A or the other floating-point product signal may be shifted by shifter circuit 563 of specialized processing block 500B. In another example, the floating-point product signal and the other floating-point product signal may both be shifted relative to each other by shifter circuits 563 of specialized processing blocks 500A and 500B, respectively.

Configurable interconnect circuitry may route the other shifted floating-point product signal and signal MULT_CHAIN_IN from the chain-in port to fixed-point adder circuit 564 of specialized processing block 500B.

Fixed-point adder circuit 564 of specialized processing block 500B may compute the sum of the other shifted floating-point product signal and signal MULT_CHAIN_IN, thereby computing the product of mantissas A and B.

Floating-point rounding circuit 503 may perform a rounding operation on the product of mantissas A and B based on a predetermined rounding scheme. The rounding scheme may be any rounding scheme that is suitable for rounding a floating-point number, such as round to zero which is sometimes also referred to as truncation, round down, round up, round to nearest number, round to nearest even, just to name a few.

If desired, floating-point rounding circuit 503 may perform a normalization operation. The normalization operation may include shifting the product of mantissas A and B to restore a '1' as the leading bit as required by the IEEE 754 standard. Floating-point rounding circuit 503 may provide information to exponent handling circuit 550. Exponent handling circuit 550 may determine the signal EXP_OUT based on the signal EXP_IN and the information received from floating-point rounding circuit 503. For example, exponent handling circuit 550 may increment EXP_IN if the rounding operation produces a carry signal and the normalization operation requires a right shift by one bit to restore a '1' as the leading bit of the product of mantissas A and B.

Floating-point rounding circuit 503 may provide the rounded floating-point product to floating-point adder circuit 505 in specialized processing block 500B. If desired, floating-point adder circuit 505 may add the rounded floating-point product to the output of multiplexer 524 and provide the floating-point sum as output signal F at an output port of specialized processing block 500B. If multiplexer 524 has selected signal G, output signal F may represent A*B+G. Thus, the two specialized processing blocks 500A and 500B may implement a floating-point addition (e.g., E=B+D) and a floating-point multiply-add operation (e.g., F=A*C+G).

Some applications, such as a systolic floating-point FIR filter, may require the accumulation of multiple floating-point multiplication operations. In the example of FIG. 5, input signal G may represent the result of another floating-point multiplication operation. In some embodiments, a result of a prior floating-point multiplication operation may be received via a cascade connection at a chain-in port and the accumulation with a current floating-point multiplication operation may occur in a floating-point adder at every other specialized processing block.

Figure 6:
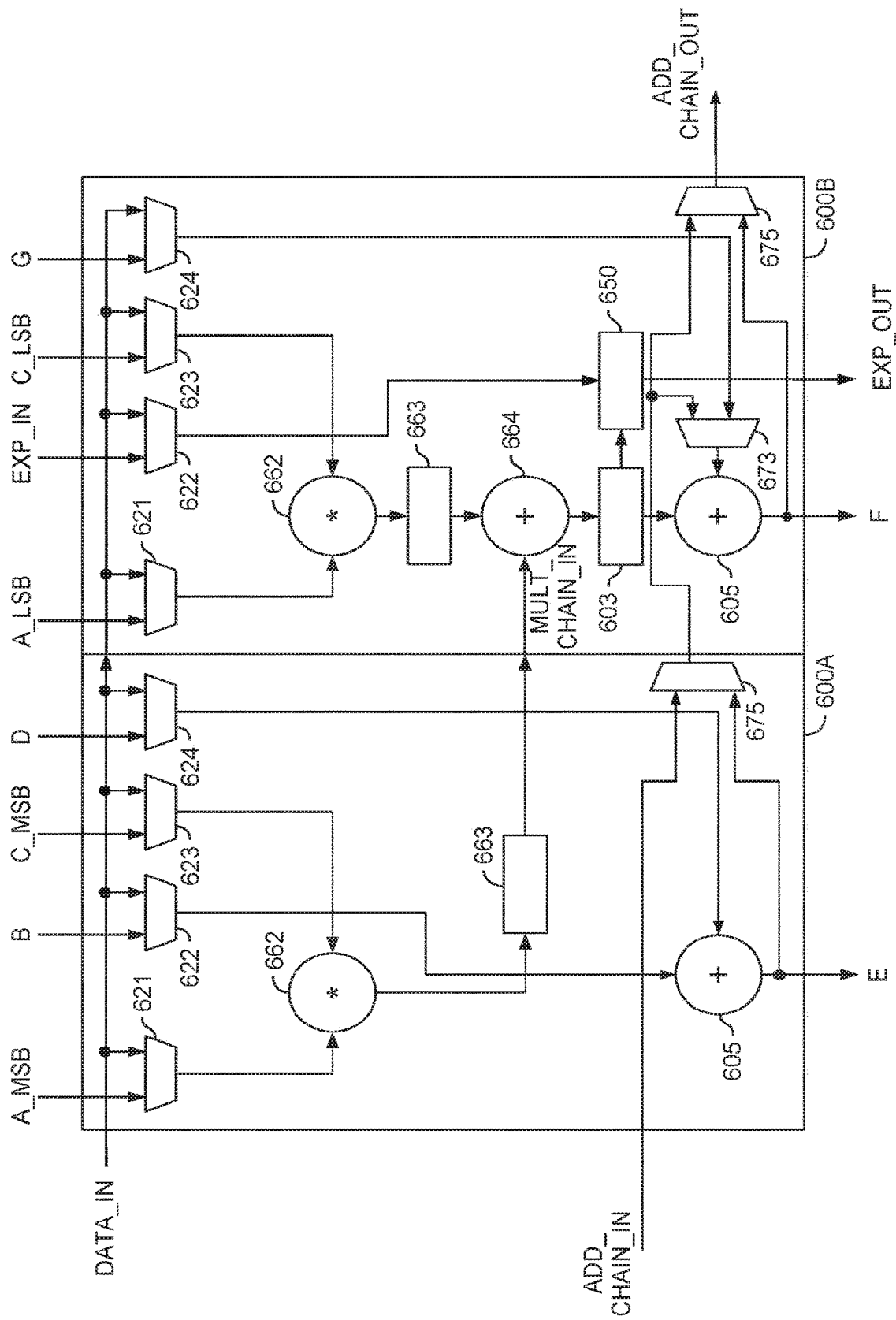
FIG. 6 is a diagram of two illustrative specialized processing blocks that are arranged in a cascade chain, use the cascade chain as a bypass path, and perform together a single-precision floating-point multiply-add operation and an additional floating-point addition in accordance with some embodiments.

FIG. 6 is a diagram of two illustrative specialized processing blocks 600A and 600B that are arranged in a cascade chain, use the cascade chain in specialized processing block 600A as a bypass path, and perform together a single-precision floating-point multiply-add operation and an additional floating-point addition in accordance with some embodiments.

If desired, specialized processing block 600A may have a first chain-out port that conveys signal DATA_IN over a first cascade connection, which is sometimes also referred to as an interblock connection, to a first chain-in port of specialized processing block 600B. Specialized processing block 600A may have a second chain-in port that conveys signal ADD_CHAIN_IN to multiplexer 675 and from there to a second chain-out port and over a second cascade connection to a second chain-in port of specialized processing block 600B. Specialized processing block 600A may have a third chain-out port that conveys signal MULT_CHAIN_IN via a third cascade connection to a third chain-in port of specialized processing block 600B.

As shown, specialized processing blocks 600A and 600B may each include multiplier circuit 662, shifter circuit 663, floating-point adder circuit 605, and configurable interconnect circuitry that may include multiplexers 621, 622, 623, 624, and 675 and routing tracks. Specialized processing block 600B may further include fixed-point adder circuit 664, floating-point rounding circuit 603, exponent handling circuit 650, and multiplexer 673. If desired, specialized processing blocks 600A and 600B may be identical. In other words, specialized processing block 600A may also include a fixed-point adder circuit 664, floating-point rounding circuit 603, exponent handling circuit 650, and multiplexer 673.

Specialized processing blocks 600A and 600B may receive input signals A, B, C, D, G, and EXP_IN at input ports and chain-in signals DATA_IN and ADD_CHAIN_IN at a respective chain-in port. If desired, signals DATA_IN, ADD_CHAIN_IN, A, B, C, D, and G may be floating-point numbers or portions of floating-point numbers. In some scenarios, DATA_IN, ADD_CHAIN_IN, A, B, C, D, and G may represent mantissas of floating-point numbers.

As an example, consider the scenario in which ADD_CHAIN_IN is a single-precision floating-point number having at least a mantissa and an exponent, and EXP_IN has information about the exponents of single-precision floating point numbers A and C. For example, EXP_IN may be a concatenation of the exponents of A and C. As another example, specialized processing block 600B may have two exponent inputs, one for the exponent of A and another for the exponent of C.

If desired, exponent handling circuit 650 may determine the exponent of the floating-point multiplication operation using the respective exponents of A and C. For example, exponent handling circuit 650 may generate the sum of the respective exponents of A and C and add the absolute value of the single-precision floating-point bias (i.e., +127) to account for the fact that the respective exponents of A and C are both biased.

In some embodiments, additional circuitry outside of specialized processing blocks 600A and 600B may determine a partial exponent result of the floating-point multiplication operation (i.e., the exponent result without normalization of the mantissa multiplication portion). In these embodiments, EXP_IN may represent the partial exponent result and exponent handling circuit 650 may increment or decrement EXP_IN during normalization of the mantissa result of the floating-point multiplication operation to determine the final exponent result.

Consider further that A, B, C, and D are mantissas of single-precision floating-point numbers (i.e., include 23 bits). If desired, at least one of A, B, C, and D may be an extended mantissa of a single-precision floating-point number (i.e., include more than 23 bits). Consider further that A_MSB and A_LSB are portions of mantissa A and that C_MSB and C_LSB are portions of mantissa C.

The portions of mantissa A and the portions of mantissa C may be distinct. If desired, the portions of mantissa A (i.e., A_MSB and A_LSB) and/or the portions of mantissa C (i.e., C_MSB and C_LSB) may overlap at least partially. In some embodiments, the portions of mantissa A (i.e., A_MSB and A_LSB) and/or the portions of mantissa C (i.e., C_MSB and C_LSB) may be identical.

For example, A_MSB, A_LSB, C_MSB, and C_LSB may be A[22:0], A[22:0], C[22:12], C[11:0], respectively. In another example, A_MSB, A_LSB, C_MSB, and C_LSB may be A[24:13], A[12:0], C[24:0], C[24:0], respectively.

In this scenario, specialized processing block 600A may receive signals A_MSB, C_MSB, B, and D, and multiplexers 621, 622, 623, and 624 of the configurable interconnect circuitry may select input signals A_MSB, B, C_MSB, and D, respectively, and route the output of multiplexers 621 and 623 as first and second multiplicand signals to multiplier circuit 662 and the output of multiplexers 622 and 624 as first and second summand signals to floating-point adder circuit 605.

Floating-point adder circuit 605 of specialized processing block 600A may generate a floating-point sum signal based on the first and second summand signals, and configurable interconnect circuitry may convey the floating-point sum signal as signal E to an output port of specialized processing block 600A.

Multiplexer 675 of specialized processing block 600A may receive signal ADD_CHAIN_IN and the floating-point sum signal and select to propagate signal ADD_CHAIN_IN over a chain-out port and a cascade connection to the corresponding chain-in port of specialized processing block 600B.

Multiplier circuit 662 of specialized processing block 600A may generate a floating-point product signal based on the first and second multiplicand signals, and configurable interconnect circuitry may convey the floating-point product signal to shifter circuit 663. In the scenario above in which the first and second multiplicand signals are portions of floating-point mantissas A and C (i.e., A_MSB and C_MSB), respectively, multiplier circuit 662 may be configured to perform a fixed-point multiplication operation of the first and second multiplicand signals, and the floating-point product signal may be a floating-point mantissa or a portion of a floating-point mantissa.

Shifter circuit 663 may shift the floating-point product signal a predetermined number of bits to the left. For example, if signal A_LSB has N bits, then the floating-point product signal may be shifted by 2N bits to the left. Configurable interconnect circuitry may route the shifted floating-point product signal to a chain-out port of specialized processing block 600A.

Specialized processing block 600B may receive signals A_LSB, C_LSB, EXP_IN, and ADD_CHAIN_IN, and multiplexers 621, 622, 623, and 673 of the configurable interconnect circuitry of specialized processing block 600B may select input signals A_LSB, EXP_IN, C_LSB, and ADD- _CHAIN_IN, respectively, and route the output of multiplexers 621 and 623 as third and fourth multiplicand signals to multiplier circuit 662, the output of multiplexer 622 to exponent handling circuit 650, and the output of multiplexer 673 as a first summand signal to floating-point adder circuit 605.

Multiplier circuit 662 of specialized processing block 600B may generate another floating-point product signal based on the third and fourth multiplicand signals, and configurable interconnect circuitry may convey the other floating-point product signal to shifter circuit 663. In the scenario above in which the third and fourth multiplicand signals are portions of floating-point mantissas A and C (i.e., A_LSB and C_LSB), respectively, multiplier circuit 662 may be configured to perform a fixed-point multiplication operation of the third and fourth multiplicand signals, and the other floating-point product signal may be a floating-point mantissa or a portion of a floating-point mantissa.

Shifter circuit 663 of specialized processing block 600B may shift the other floating-point product signal by a predetermined number of bits in a predetermined direction (e.g., to the left or to the right). As an example, the other floating-point product signal may not be shifted. If desired, the shift operation performed by shifter circuit 663 of specialized processing block 600B may depend on the shift operation performed by shifter circuit 663 of specialized processing block 600A. For example, the floating-point product signal may be shifted by shifter circuit 663 of specialized processing block 600A or the other floating-point product signal may be shifted by shifter circuit 663 of specialized processing block 600B. In another example, the floating-point product signal and the other floating-point product signal may both be shifted relative to each other by shifter circuits 663 of specialized processing blocks 600A and 600B, respectively.

Configurable interconnect circuitry may route the other shifted floating-point product signal and signal MULT_CHAIN_IN from the chain-in port to fixed-point adder circuit 664 of specialized processing block 600B.

Fixed-point adder circuit 664 of specialized processing block 600B may compute the sum of the other shifted floating-point product signal and signal MULT_CHAIN_IN, thereby computing the product of mantissas A and B.

Floating-point rounding circuit 603 may perform a rounding operation on the product of mantissas A and B based on a predetermined rounding scheme. The rounding scheme may be any rounding scheme that is suitable for rounding a floating-point number, such as round to zero which is sometimes also referred to as truncation, round down, round up, round to nearest number, round to nearest even, just to name a few.

If desired, floating-point rounding circuit 603 may perform a normalization operation. The normalization operation may include shifting the product of mantissas A and B to restore a '1' as the leading bit as required by the IEEE 754 standard.

Floating-point rounding circuit 603 may provide information to exponent handling circuit 650. Exponent handling circuit 650 may determine the signal EXP_OUT based on the signal EXP_IN and the information received from floating-point rounding circuit 603. For example, exponent handling circuit 650 may increment EXP_IN if the rounding operation produces a carry signal and the normalization operation requires a right shift by one bit to restore a '1' as the leading bit of the product of mantissas A and B.

Floating-point rounding circuit 603 may provide the rounded floating-point product to floating-point adder circuit 605 in specialized processing block 600B. If desired, floating-point adder circuit 605 may add the rounded floating-point product to the output of multiplexer 673 and provide the floating-point sum as output signal F at an output port of specialized processing block 600B and via multiplexer 675 as signal ADD_CHAIN_OUT at a chain-out port of specialized processing block 600B.

If multiplexer 673 has selected signal ADD_CHAIN_IN, output signal F may represent F=A*B+ADD_CHAIN_IN. Thus, the two specialized processing blocks 600A and 600B may implement a floating-point addition (e.g., E=B+D) and a floating-point multiply-add operation (e.g., F=ADD_CHAIN_OUT=A*C+ADD_CHAIN_IN).

Figure 7:
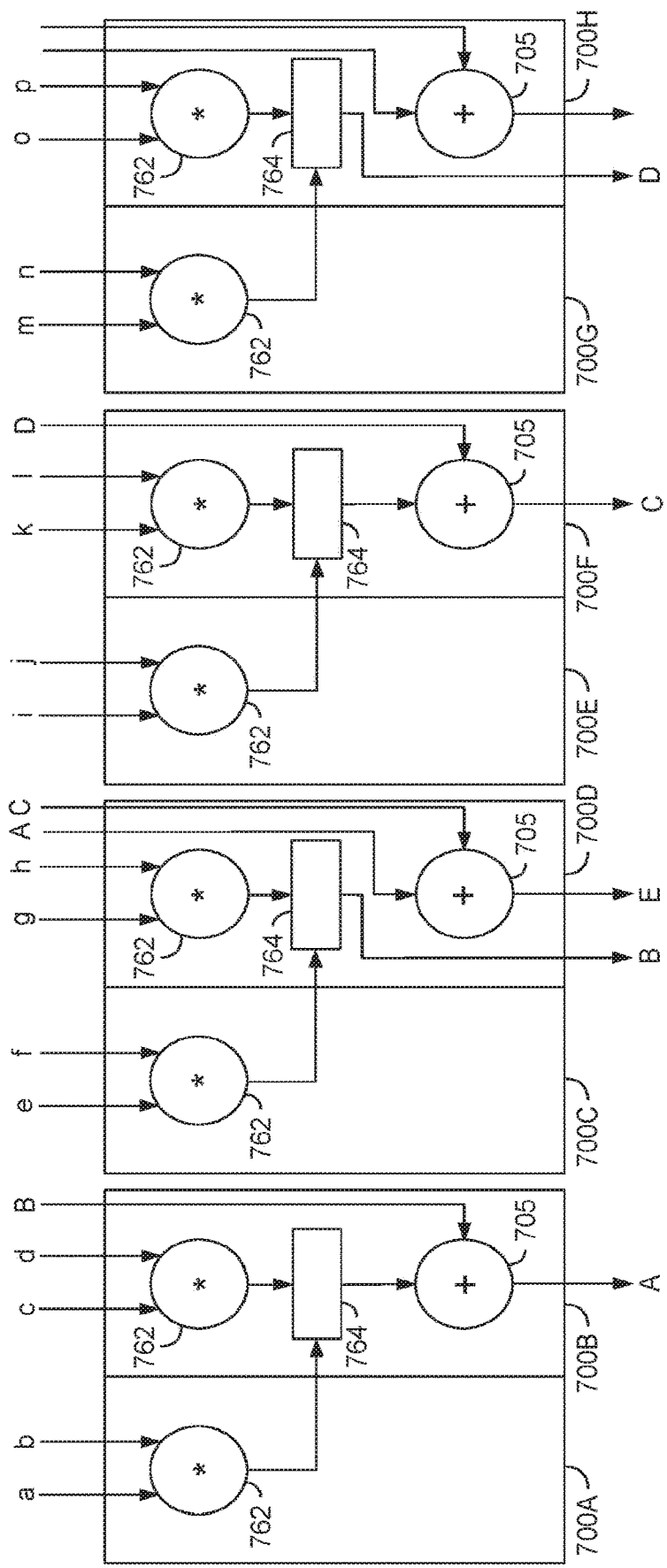
FIG. 7 is a diagram of eight illustrative specialized processing blocks that are arranged in a cascade chain and perform a recursive mode dot product of two vectors of floating-point numbers in accordance with some embodiments.

If desired, more than two specialized processing blocks may be configured to perform together a recursive mode dot product of two vectors of floating-point numbers. As an example, such a recursive mode dot product can be used to implement a direct form II FIR filter, among other things. FIG. 7 is a diagram of eight illustrative specialized processing blocks 700A, 700B, 700C, 700D, 700E, 700F, 700G, and 700H that are arranged in a cascade chain and perform a recursive mode dot product of two vectors of floating-point numbers in accordance with some embodiments.

As shown, each specialized processing block of specialized processing blocks 700A-700H may include multiplier circuit 762. Every other specialized processing block in the cascade chain (i.e., specialized processing blocks 700B, 700D, 700F, and 700H) may further include floating-point adder circuit 705 and fixed-point adder circuit 764.

If desired, all specialized processing blocks 700A-700H may be identical. In other words, specialized processing blocks 700A, 700C, 700E, and 700G may also include a fixed-point adder circuit 764 and a floating-point adder circuit 705. If desired, at least some specialized processing blocks of specialized processing blocks 700A-700H may include configurable interconnect circuitry that may include multiplexers and routing tracks that are configured to implement the connections between respective inputs, multiplier circuit 762, fixed-point adder circuit 764, floating-point adder circuit 705, and outputs as shown in FIG. 7. In some embodiments, specialized processing block 200 of FIG. 2 may implement at least some specialized processing blocks of specialized processing blocks 700A-700H.

Consider the scenario in which specialized processing blocks 700A-700H are configured to implement the dot product E=X*Y of vectors X and Y. Vectors X and Y may be X=(a, c, e, g, i, k, m, o) and Y=(b, d, f, h, j, 1, n, p) with a, b, c, d, e, f, g, h, i, j, k, 1, m, n, o, p being mantissas of floating-point numbers. If desired, vectors X and Y may be X=({a, c}, {e, g}, {i, k}, {m, o}) and Y=({b, d}, {f, h}, {j, l}, {n, p}) with a, e, m, b, f, j, and n being MSBs of mantissas of floating-point numbers and c, g, k, o, d, h, 1, and p being LSBs of mantissas of floating-point numbers.

As shown, specialized processing blocks 700C and 700D may together generate value B with B=(e*f+g*h). Similarly, specialized processing blocks 700G and 700H may together generate value D with D=(m*n+o*p). Configurable interconnect circuitry outside of specialized processing blocks 700A-700H may route values B and D from the outputs of specialized processing blocks 700D and 700H, respectively, to the inputs of specialized processing blocks 700B and 700F, respectively.

Specialized processing blocks 700A and 700B may together generate value A with A=(a*b+c*d+B)=(a*b+c*d+e*f+g*h). Similarly, specialized processing blocks 700E and 700F may together generate value C with C=(i*j+k*l+D)=(i*j+k*l+m*n+o*p). Configurable interconnect circuitry outside of specialized processing blocks 700A-700H may route values A and C from the outputs of specialized processing blocks 700B and 700F, respectively, to the inputs of specialized processing block 700D. Floating-point adder circuit 705 of specialized processing block 700D may generate E=X*Y by adding A to C.

Thus, every other pair of specialized processing blocks may be similarly configured. For example, specialized processing blocks 700A and 700B may be configured similarly to specialized processing blocks 700E and 700F, and specialized processing blocks 700C and 700D may be configured similarly to specialized processing blocks 700G and 700H. The resultant recursive structure is a very efficient low latency implementation of a dot product as shown for example in U.S. Pat. No. 9,207,908 which is hereby incorporated herein in its entirety.

In some scenarios, specialized processing blocks 700A, 700C, 700E, and 700G also include floating-point adder circuit 705. In these scenarios, floating-point adder circuits 705 of specialized processing blocks 700A, 700C, 700E, and 700G may be independently accessed as shown in FIG. 6 to provide pre-adders for this structure when used as a FIR filter, as an example.

Figure 8:
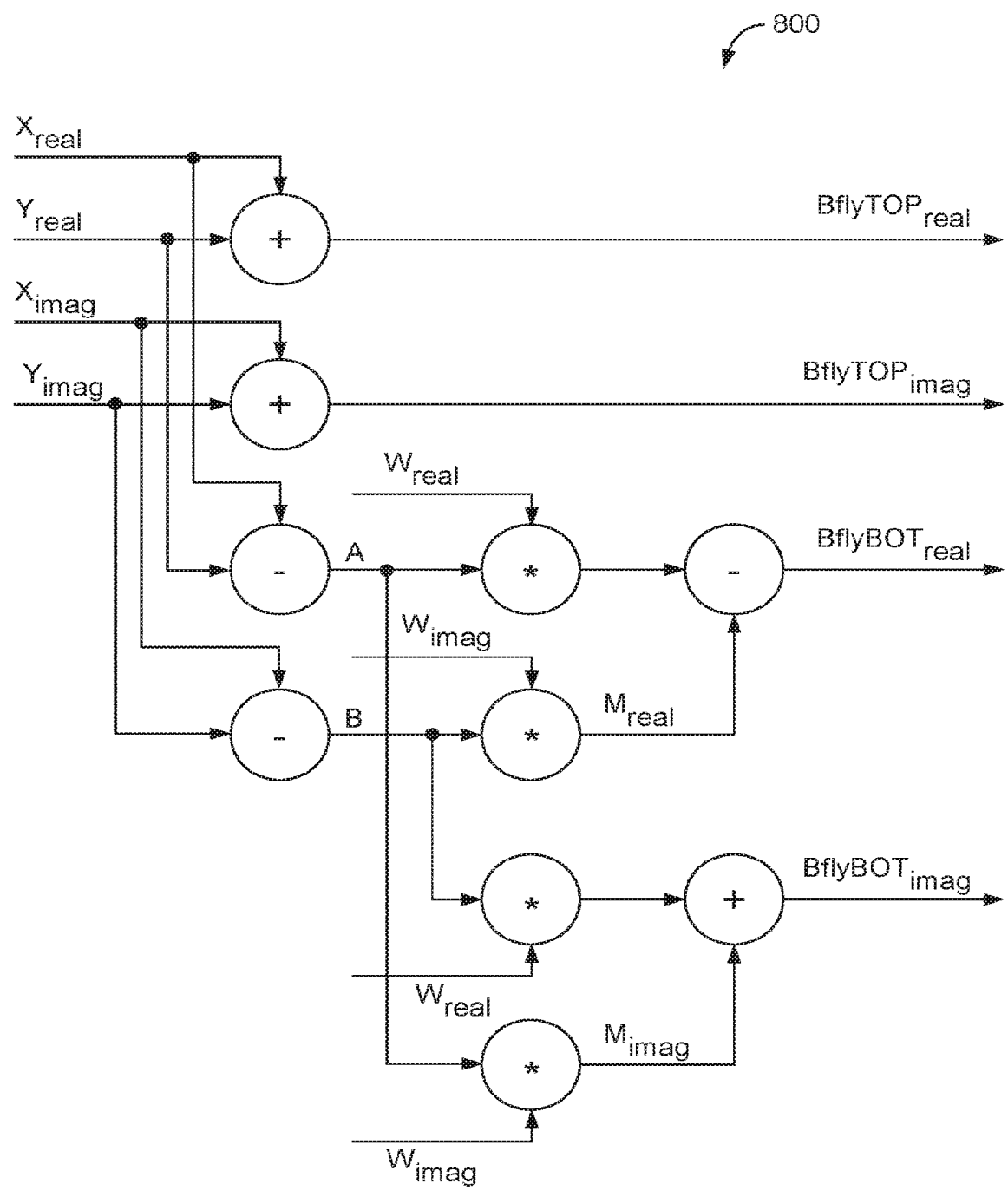
FIG. 8 is a diagram of an illustrative Radix-2 Butterfly circuit in accordance with some embodiments.

Specialized processing blocks that all include a multiplier circuit and a floating-point adder circuit may implement floating-point Fast Fourier Transforms (FFTs) efficiently. For example, consider implementing an illustrative Radix-2 Butterfly circuit as shown in FIG. 8.

The Radix-2 Butterfly circuit may receive three complex inputs (X_real, X_imag), (Y_real, Y_imag), and (W_real, W_imag). If desired, W_real and W_imag may represent the real and imaginary portion of a twiddle factor. As shown, X_real and Y_real may be added to compute the MSBs of the real output (i.e., BflyTOP_real). Similarly, X_imag and Y_imag may be added to compute the MSBs of the imaginary output (i.e., BflyTOP_imag).

The difference of X_real and Y_real and the difference of X_imag and Y_imag may generate values A and B, respectively. A may be multiplied with W_imag and B with W_imag to form M_imag and M_real, respectively.

M_real may be subtracted from the product of A and W_real to compute the LSBs of the real output (i.e., BflyBOT_real). M_imag may be added to the product of B and W_real to compute the LSBs of the imaginary output (i.e., BflyBOT_imag).

Figure 9:
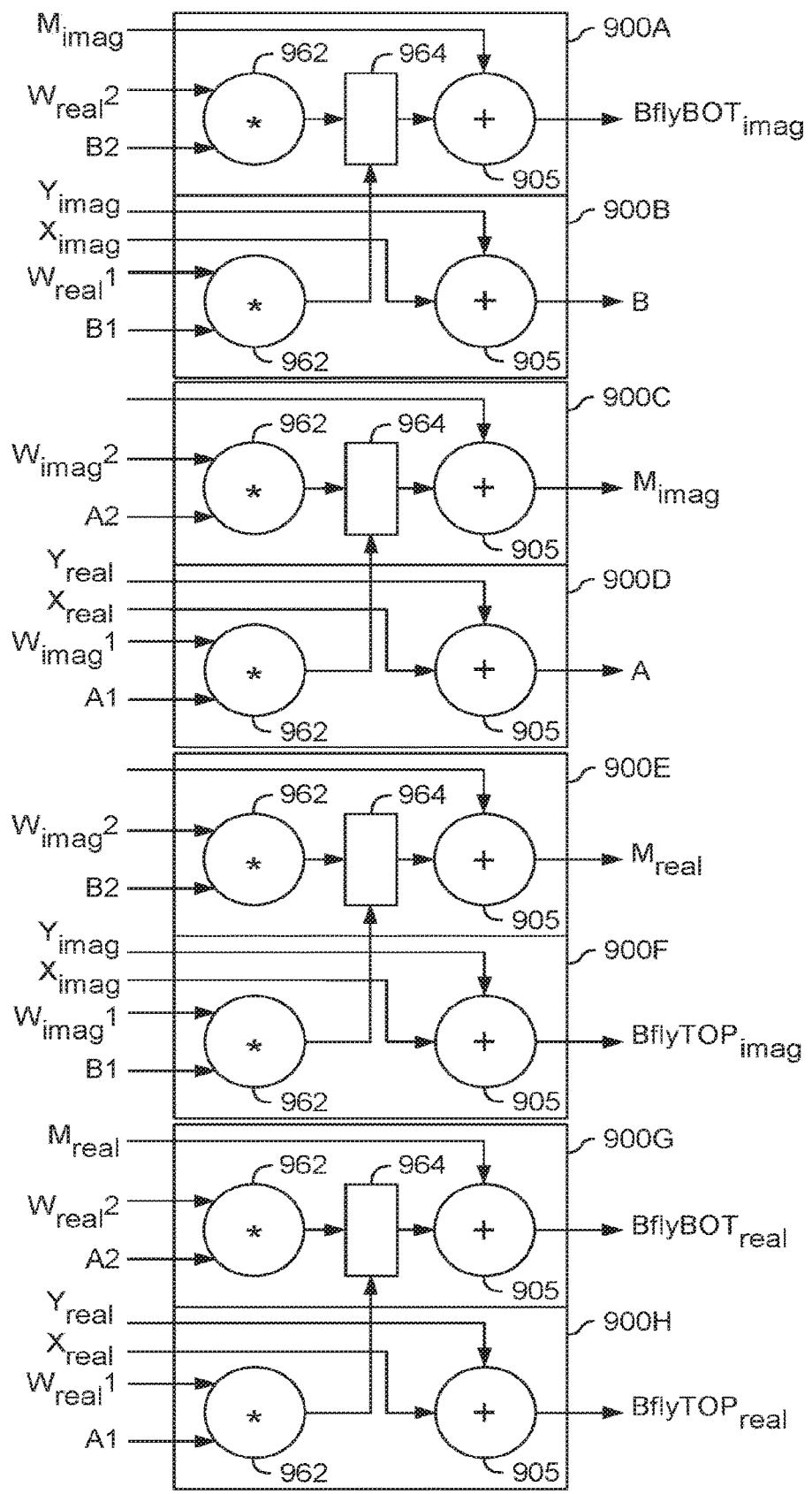
FIG. 9 is a diagram of eight illustrative specialized processing blocks that are arranged in a cascade chain and implement the illustrative Radix-2 Butterfly circuit of FIG. 8 in accordance with some embodiments.

As shown, the Radix-2 Butterfly circuit of FIG. 8 may be implemented using four multipliers and six adders with three of the six adders effectively implementing a subtraction operation. Such a Radix-2 Butterfly circuit may be efficiently mapped to eight illustrative specialized processing blocks 900A, 900B, 900C, 900D, 900E, 900F, 900G, and 900H that are arranged in a cascade chain as shown in FIG. 9.

As shown, each specialized processing block of specialized processing blocks 900A-900H may include multiplier circuit 962 and floating-point adder circuit 905. Every other specialized processing block in the cascade chain (i.e., specialized processing blocks 900A, 900C, 900E, and 900G) may further include fixed-point adder circuit 964.

If desired, all specialized processing blocks 900A-900H may be identical. In other words, specialized processing blocks 900B, 900D, 900F, and 900H may also include a fixed-point adder circuit 964. If desired, at least some specialized processing blocks of specialized processing blocks 900A-900H may include configurable interconnect circuitry that may include multiplexers and routing tracks that are configured to implement the connections between respective inputs, multiplier circuit 962, fixed-point adder circuit 964, floating-point adder circuit 905, and outputs as shown in FIG. 9. In some embodiments, specialized processing block 200 of FIG. 2 may implement at least some specialized processing blocks of specialized processing blocks 900A-900H.

The floating-point adder circuit 905 of every other specialized processing block may receive floating-point numbers from the inputs of the respective specialized processing block and implement an addition or subtraction operation of these floating-point numbers. For example, specialized processing blocks 900B and 900F may receive signals X_imag and Y_imag and generate signals B and BflyTOP_imag, respectively, while specialized processing blocks 900D and 900H receive signals X_real and Y_real and generate signals A and BflyTOP_real, respectively.

As shown, each multiplier circuit 962 of specialized processing blocks 900A-900H may implement a portion of a floating-point mantissa multiplication operation, and the fixed-point adder circuit 964 in specialized processing blocks 900A, 900C, 900E, and 900G may combine the portions into a complete floating-point mantissa multiplication operation. Thus, every pair of specialized processing blocks 900A and 900B, 900C and 900D, 900E and 900F, 900G and 900H may implement a complete floating-point mantissa multiplication operation.

For example, specialized processing blocks 900A and 900B may receive the LSBs and the MSBs of signal B (i.e., B2 and B1) and signal W_real (i.e., W_real_2 and W_real_1), respectively, and use multiplier circuits 962 and fixed-point adder circuit 964 to generate the product of B and W_real. Similarly, specialized processing blocks 900C and 900D may receive the LSBs and the MSBs of signals A (i.e., A2 and A1) and signal W_imag (i.e., W_imag_2 and W_imag_1), respectively, and use multiplier circuits 962 and fixed-point adder circuit 964 to generate M_imag as the product of A and W_imag. Specialized processing blocks 900E and 900F may receive the LSBs and the MSBs of signals B (i.e., B2 and B1) and signal W_imag (i.e., W_imag_2 and W_imag_1), respectively, and use multiplier circuits 962 and fixed-point adder circuit 964 to generate M_real as the product of B and W_imag. Specialized processing blocks 900G and 900H may receive the LSBs and the MSBs of signal A (i.e., A2 and A1) and signal W_real (i.e., W_real_2 and W_real_1), respectively, and use multiplier circuits 962 and fixed-point adder circuit 964 to generate the product of A and W_real.

As shown, floating-point adder circuits 905 of specialized processing blocks 900A and 900G may receive a floating-point number from an input of the respective specialized processing block and implement an addition or subtraction operation of this floating-point number and the product computed by the respective multiplier circuits 962 and fixed-point adder circuit 964. For example, specialized processing block 900A may generate signal BflyBOT_imag as the sum of signal M_imag and the product of signals B and W_real. Similarly, specialized processing block 900G may generate signal BflyBOT_real as the difference of signal M_real and the product of signals A and W_real.

As shown in FIG. 9, floating-point adder circuits 905 of specialized processing blocks 900C and 900E remain unused and may be independently used in a different computation, if desired.

Figure 10:
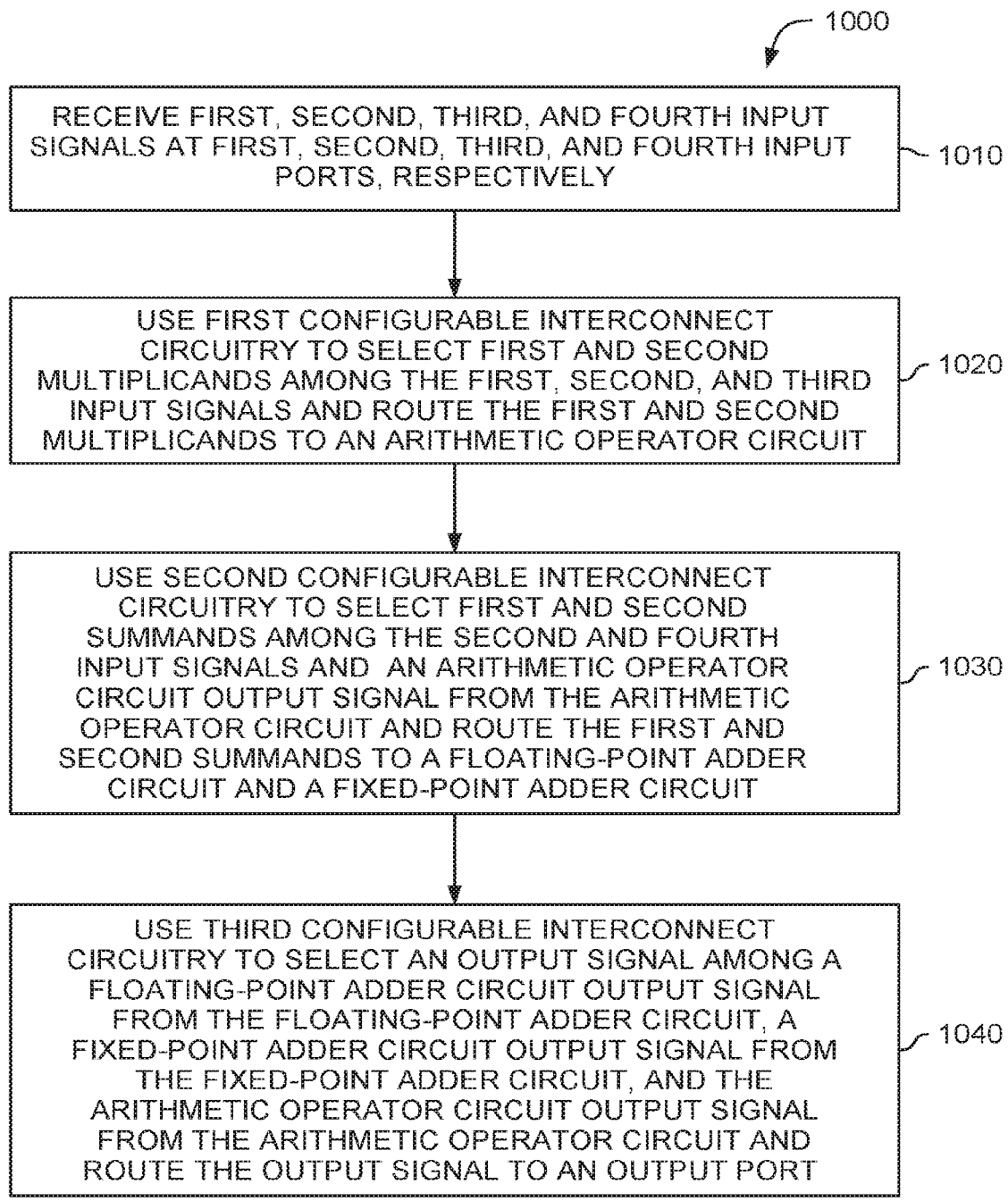
FIG. 10 is a diagram of a flow chart showing illustrative steps for operating a specialized processing block that is configurable to perform fixed-point arithmetic operations and floating-point arithmetic operations in accordance with some embodiments.

FIG. 10 is a diagram of a flow chart showing illustrative steps for operating a specialized processing block that is configurable to perform fixed-point arithmetic operations and floating-point arithmetic operations in accordance with some embodiments.

During operation 1010, the specialized processing block may receive first, second, third, and fourth input signals at first, second, third, and fourth input ports, respectively. For example, specialized processing block 200 of FIG. 2 may receive input signals A, B, C, and D at input ports 291, 293, 295, and 297, respectively.

During operation 1020, the specialized processing block may use first configurable interconnect circuitry to select first and second multiplicands among the first, second, and third input signals and route the first and second multiplicands to an arithmetic operator circuit. For example, specialized processing block 200 of FIG. 2 may use the configurable interconnect circuitry (e.g., interconnections and multiplexers 221, 222, 223, and 271) to select first and second multiplicands among input signals A, B, and C and route the first and second multiplicands to arithmetic operator circuit 202.

During operation 1030, the specialized processing block may use second configurable interconnect circuitry to select first and second summands among the second and fourth input signals and an arithmetic operator circuit output signal from the arithmetic operator circuit and route the first and second summands to a floating-point adder circuit and a fixed-point adder circuit. For example, specialized processing block 200 of FIG. 2 may use the configurable interconnect circuitry (e.g., interconnections and multiplexers 221, 224, 272, 273, and 274) to select first and second summands among input signals B and C and an arithmetic operator circuit output signal from arithmetic operator circuit 202 and route the first and second summands to floating-point adder circuit 205 and fixed-point adder circuit 206.

During operation 1040, the specialized processing block may use third configurable interconnect circuitry to select an output signal among a floating-point adder circuit output signal from the floating-point adder circuit, a fixed-point adder circuit output signal from the fixed-point adder circuit, and the arithmetic operator circuit output signal from the arithmetic operator circuit and route the output signal to an output port. For example, specialized processing block 200 of FIG. 2 may use the configurable interconnect circuitry (e.g., interconnections and multiplexer 209) to select output signal E among a floating-point adder circuit output signal from floating-point adder circuit 205, a fixed-point adder circuit output signal from fixed-point adder circuit 206, and an arithmetic operator circuit output signal from arithmetic operator circuit 202 and route output signal E to output port 294.

The method and apparatus described herein may be incorporated into any suitable circuit or system of circuits. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), coarse-grained reconfigurable architectures (CGRAs), digital signal processing (DSP) circuits, application specific standard products (ASSPs), application specific integrated circuits (ASICs), just to name a few.

The integrated circuit described herein may be part of a data processing system that includes one or more of the following components: a processor; memory; I/O circuitry; and peripheral devices. The data processing system can be used in a wide variety of applications, such as computer networking, data networking, instrumentation, video processing, digital signal processing, or any suitable other application where the advantage of using circuitry that efficiently performs floating-point arithmetic operations and fixed-point arithmetic operations is desirable.

The integrated circuit may be configured to perform a variety of different logic functions. For example, the integrated circuit may be configured as a processor or controller that works in cooperation with a system processor. The integrated circuit may also be used as an arbiter for arbitrating access to a shared resource in the data processing system. In yet another example, the integrated circuit may be configured as an interface between a processor and one of the other components in the system. In one embodiment, the integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing.

The foregoing is merely illustrative of the principles of the embodiments and various modifications can be made by those skilled in the art without departing from the scope and spirit of the embodiments disclosed herein, which are presented for purposes of illustration and not of limitation. The foregoing embodiments may be implemented individually or in any combination.

The following examples pertain to further embodiments.

Example 1 is a specialized processing block that is configurable to perform fixed-point arithmetic operations and floating-point arithmetic operations, including first, second, third, and fourth input ports, an arithmetic operator circuit, a floating-point adder circuit, a fixed-point adder circuit, first configurable interconnect circuitry coupling the first, second, and third input ports to the arithmetic operator circuit, second configurable interconnect circuitry coupling the arithmetic operator circuit and the second and fourth input ports to the floating-point adder circuit and the fixed-point adder circuit.

Example 2 includes the subject matter of Example 1, and can optionally further include an output port and third configurable interconnect circuitry coupling the floating-point adder circuit, the fixed-point adder circuit, and the arithmetic operator circuit to the output port.

Example 3 includes the subject matter of Example 2, wherein the third configurable interconnect circuitry further includes a multiplexer that selects between a product signal received from the arithmetic operator circuit, a floating-point sum signal received from the floating-point adder circuit, and a fixed-point sum signal received from the fixed-point adder circuit based on a control signal.

Example 4 includes the subject matter of any one of Examples 1-2, wherein the arithmetic operator circuit further includes a multiplier circuit that generates a product signal based on first and second multiplicand signals received via the first configurable interconnect circuitry.

Example 5 includes the subject matter of Example 4, wherein the arithmetic operator circuit further includes a fifth input port, a shifter circuit that generates a shifted product signal by shifting the product signal from the multiplier circuit by a predetermined number of bits in a predetermined direction, and an additional fixed-point adder circuit that generates an arithmetic operator circuit output signal by adding the shifted product signal and another signal received from the fifth input port.

Example 6 includes the subject matter of any one of Examples 1, 2, or 4, and can optionally further include a floating-point rounding circuit coupled between the arithmetic operator circuit and the floating-point adder circuit that performs a rounding operation on a signal received from the arithmetic operator circuit based on a predetermined rounding scheme.

Example 7 includes the subject matter of any one of Examples 1, 2, 4, or 6, and can optionally further include a logic circuit block coupled between the arithmetic operator circuit and the fixed-point adder circuit, wherein the logic circuit block is configurable to perform a logical operation on a signal received from the arithmetic operator circuit.

Example 8 includes the subject matter of any one of Examples 1, 2, 4, 6, or 7, and can optionally further include a pre-adder that receives first and second summand signals via a first portion of the first configurable interconnect circuitry from the first and second input ports, generates a sum based on the first and second summand signals, and sends the sum via a second portion of the first configurable interconnect circuitry to the arithmetic operator circuit.

Example 9 is a method for operating a specialized processing block that is configurable to perform fixed-point arithmetic operations and floating-point arithmetic operations, including receiving first, second, third, and fourth input signals at first, second, third, and fourth input ports, respectively, using first configurable interconnect circuitry to select first and second multiplicands among the first, second, and third input signals and route the first and second multiplicands to an arithmetic operator circuit, using second configurable interconnect circuitry to select first and second summands among the second and fourth input signals and an arithmetic operator circuit output signal from the arithmetic operator circuit and route the first and second summands to a floating-point adder circuit and a fixed-point adder circuit, and using third configurable interconnect circuitry to select an output signal among a floating-point adder circuit output signal from the floating-point adder circuit, a fixed-point adder circuit output signal from the fixed-point adder circuit, and the arithmetic operator circuit output signal from the arithmetic operator circuit and route the output signal to an output port.

Example 10 includes the subject matter of Example 9, further including using a multiplier circuit in the arithmetic operator circuit to generate a product signal based on the first and second multiplicands.

Example 11 includes the subject matter of Example 10, further including using a shifter circuit in the arithmetic operator circuit to generate a shifted product signal by shifting the product signal by a predetermined number of bits in a predetermined direction.

Example 12 includes the subject matter of Example 11, further including receiving a fifth input signal at a fifth input port, and using an additional fixed-point adder circuit in the arithmetic operator circuit to generate the arithmetic operator circuit output signal by adding the shifted product signal to the fifth input signal.

Example 13 includes the subject matter of any one of Examples 9 or 10, further including using a floating-point rounding circuit that is coupled between the arithmetic operator circuit and the floating-point adder circuit to perform a floating-point rounding operation on the arithmetic operator circuit output signal.

Example 14 includes the subject matter of any one of Examples 9, 10 or 13, further including using a logic circuit block that is coupled between the arithmetic operator circuit and the fixed-point adder circuit to perform a logical operation on the arithmetic operator circuit output signal.

Example 15 includes the subject matter of any one of Examples 9, 10, 13, or 14, further including using a first portion of the first configurable interconnect circuitry to route the first and second input signals from the first and second input ports to a pre-adder, using the pre-adder to generate a sum signal based on the first and second input signals, and using a second portion of the first configurable interconnect circuitry to route the sum signal to the arithmetic operator circuit.

Example 16 is an integrated circuit, including a specialized processing block that is configurable to perform fixed-point arithmetic operations and floating-point arithmetic operations and includes first, second, third, and fourth input ports that receive first, second, third, and fourth input signals, respectively, an output port, an arithmetic operator circuit that generates a product signal based on first and second multiplicand signals, a floating-point adder circuit, a fixed-point adder circuit, first configurable interconnect circuitry coupling the first, second, and third input ports to the arithmetic operator circuit, wherein the first configurable interconnect circuitry is configured to select the first and second multiplicands among the first, second, and third input signals and route the first and second multiplicands to the arithmetic operator circuit, second configurable interconnect circuitry coupling the arithmetic operator circuit and the second and fourth input ports to the floating-point adder circuit and the fixed-point adder circuit, and third configurable interconnect circuitry coupling the floating-point adder circuit, the fixed-point adder circuit, and the arithmetic operator circuit to the output port.

Example 17 includes the subject matter of Example 16, wherein the specialized processing block further includes a chain-out port, and a shifter that is coupled between the arithmetic operator circuit and the chain-out port and generates a shifted product signal by shifting the product signal by a predetermined number of bits in a predetermined direction.

Example 18 includes the subject matter of any one of Examples 16-17, wherein the second configurable interconnect circuitry is configured to route the second and fourth input signals to the floating-point adder circuit, and wherein the floating-point adder circuit generates a floating-point sum by adding the second and fourth input signals.

Example 19 includes the subject matter of any one of Examples 17-18, further including an additional specialized processing block that is configurable to perform fixed-point arithmetic operations and floating-point arithmetic operations and includes fifth, sixth, and seventh input ports that receive fifth, sixth, and seventh input signals, respectively, an additional arithmetic operator circuit that generates an additional product signal based on third and fourth multiplicand signals, fourth configurable interconnect circuitry coupling the fifth, sixth, and seventh input ports to the additional arithmetic operator circuit, wherein the fourth configurable interconnect circuitry is configured to select the third and fourth multiplicands among the fifth, sixth, and seventh input signals and route the third and fourth multiplicands to the additional arithmetic operator circuit, a chain-in port that is coupled to the chain-out port of the specialized processing block and receives the shifted product signal, and an additional adder circuit that generates a sum of the shifted product signal and the additional product signal.

Example 20 includes the subject matter of Example 19, wherein the additional specialized processing block further includes an eighth input port that receives an eighth input signal, and an additional floating-point adder circuit that generates a floating-point sum by adding the sum and the eighth input signal.

Example 21 includes the subject matter of Example 16, and further include a storage circuit.

Example 22 includes the subject matter of Example 21, wherein the storage circuit is selected from the group consisting of a first-in first-out circuit, a last-in first-out circuit, a serial-in parallel-out shift register circuit, a parallel-in serial-out shift register circuit, a random-access memory circuit, a read-only memory circuit, a content-addressable memory circuit, and a register file.

Example 23 includes the subject matter of Example 16, and further includes a pin, and a serial receiver circuit that receives a serialized data signal from the pin and parallelizes at least a portion of the serialized data signal.

Example 24 includes the subject matter of Example 16, and further includes a pin, and a serial transmitter circuit that receives a parallel data signal from the specialized processing block, serializes the parallel data signal to generate a serialized data signal, and transmits the serialized data signal to the pin.

Example 25 includes the subject matter of Example 16, and further includes a programmable logic region.

Example 26 includes the subject matter of Example 25, wherein the programmable logic region includes a plurality of look-up table circuits.

Example 27 includes the subject matter of Example 16, and further includes interconnection resources that are coupled to the input port of the specialized processing block.

Example 28 includes the subject matter of Example 27, wherein the interconnection resources include horizontal and vertical interconnection resources.

Example 29 includes the subject matter of Example 27, wherein the interconnection resources include a plurality of conductive lines.

Example 30 includes the subject matter of Example 29, and further includes a programmable connection between a first conductive line of the plurality of conductive lines and a second conductive line of the plurality of conductive lines.

Example 31 is a specialized processing block that is configurable to perform fixed-point arithmetic operations and floating-point arithmetic operations, including inputs for receiving input signals, a first circuit for performing an arithmetic operation and generating an arithmetic result signal, a second circuit for generating a floating-point sum, a third circuit for generating a fixed-point sum, first configurable interconnect for routing the input signals to the first circuit, second configurable interconnect for routing the arithmetic result signal and two of the input signals to the second and the third circuit.

Example 32 includes the subject matter of Example 31, and can optionally further include an output port and third configurable interconnect for routing the floating-point sum, the fixed-point sum, and the arithmetic result signal to the output port.

Example 33 includes the subject matter of any one of Examples 31-32, wherein the first circuit further includes a multiplier for generating a product signal based on first and second multiplicand signals received via the first configurable interconnect.

Example 34 includes the subject matter of Example 33, wherein the first circuit further includes a shifter for generating a shifted product signal by shifting the product signal by a predetermined number of bits in a predetermined direction.

Example 35 includes the subject matter of Example 34, and a fourth circuit for performing a fixed-point addition of the shifted product signal and another input signal of the input signals.

Example 36 includes the subject matter of any one of Examples 31, 32, or 35, and can optionally further include a rounding circuit for performing a rounding operation on the arithmetic result signal based on a predetermined rounding scheme.

Example 37 includes the subject matter of any one of Examples 31, 32, 35, or 36, and can optionally further include a logic circuit for performing a logical operation on the arithmetic result signal.

The invention claimed is:

1. Processing circuitry that is configurable to perform fixed-point arithmetic operations and floating-point arithmetic operations, comprising:
   a plurality of input ports;
   an dynamic multiplication circuit that selectively performs fixed-point multiplication or floating-point multiplication, wherein a product of the dynamic multiplication circuit is based at least in part on a subset of the plurality of input ports;
   a plurality of adder circuits configured to perform addition on the product based at least in part on a mode of processing circuitry; and
   selection circuitry configured to select an output for the processing circuitry based at least in part on the product and on control signals received by the processing circuitry, wherein selecting the output comprises selecting a bypass of the plurality of adder circuits in a no-add mode.

2. The processing circuitry of claim 1, comprising a floating-point adder circuit of the plurality of adder circuits that receives the product when the control signals indicate that a floating-point operation is to be performed using the product.

3. The processing circuitry of claim 2, wherein the selection circuitry is configured to select the output from the floating-point adder circuit based at least in part on the control signals.

4. The processing circuitry of claim 3, comprising a floating-point rounding circuit configured to:
   receive the product from the dynamic multiplication circuit;
   adjust the product by performing an operation on the product; and
   output the adjusted product to the selection circuitry.

5. The processing circuitry of claim 4, wherein the operation comprises rounding the product.

6. The processing circuitry of claim 5, wherein rounding the product comprises a round up operation, a round down operation, or a round-to-nearest-number operation.

7. The processing circuitry of claim 4, wherein the operation comprises a normalization operation including shifting a mantissa to restore a value and increment or decrement an exponent accordingly.

8. The processing circuitry of claim 1, comprising a fixed-point adder circuit of the plurality of adder circuits that receives the product when the control signals indicate that a fixed-point operation is to be performed using the product.

9. The processing circuitry of claim 8, wherein the selection circuitry is configured to select the output from the fixed-point adder circuit based at least in part on the control signals.

10. The processing circuitry of claim 9, comprising a logic block circuit that receives the product when the control signals indicate that a fixed-point operation is to be performed using the product.

11. The processing circuitry of claim 10, wherein the logic block circuit is configured to perform a unary operation on the product.

12. The processing circuitry of claim 11, wherein the unary operation comprises an identity operation or an inversion operation.

13. The processing circuitry of claim 10, wherein the logic block circuit is configured to perform a binary operation between the product and an additional input to the processing circuitry.

14. The processing circuitry of claim 13, wherein the binary operation comprises a logical AND operation, a logical NAND operation, a logical OR operation, a logical NOR operation, a logical XOR operation, a left-shift operation, or a right-shift operation.

15. A method, comprising:
receiving a plurality of inputs at a plurality of ports;
selecting a mode of multiplication to be applied by a dynamic multiplication circuit, wherein the selection of the mode of multiplication comprises selecting between a fixed-point multiplication mode and a floating-point multiplication mode;
multiplying a subset of the plurality of inputs together using the selected mode of multiplication to generate a product;
selectively transmitting, using selection circuitry, the product to an adder circuit based at least in part on a control signal indicating an adder mode or a no-adder mode, wherein selectively transmitting comprises:
transmitting the product to a fixed-point adder circuit when the adder mode comprises a fixed-point adder mode;
transmitting the product to a floating-point adder circuit when the adder mode comprises a floating-point adder mode; and
bypassing the fixed-point adder circuit and the floating-point adder circuit when the adder mode comprises the no-adder mode; and
outputting an output value based at least in part on the mode of multiplication and the adder mode.

16. The method of claim 15, comprising:
receiving the product from the dynamic multiplication circuit at floating-point rounding circuit in the floating-point adder mode;
adjusting the product by performing an operation on the product; and
outputting the adjusted product to the selection circuitry.

17. The method of claim 16, wherein the operation comprises rounding the product or normalizing the product.

18. An integrated circuit device, comprising:
a plurality of input ports;
an dynamic multiplication circuit that selectively performs fixed-point multiplication or floating-point multiplication, wherein a product of the dynamic multiplication circuit is based at least in part on a subset of the plurality of input ports;
adder selection circuitry that selectively routes the product of the dynamic multiplication circuit;
a plurality of adder circuits that each selectively receives the product based at least in part on adder control signals used to configure the adder selection circuitry in an adder mode; and
selection circuitry that selects an output for the integrated circuit device based at least in part on the product and routing of the product by the adder selection circuitry, wherein selectively routing comprises bypassing the plurality of adder circuits and transmitting the product to the selection circuitry based at least in part on the adder mode comprising a no-add mode.

19. The integrated circuit device of claim 18, wherein selectively routing comprises:
transmitting the product to a fixed-point adder circuit of the plurality of adder circuits when the adder mode comprises a fixed-point adder mode; and
transmitting the product to a floating-point adder circuit of the plurality of adder circuits when the adder mode comprises a floating-point adder mode.

20. The integrated circuit device of claim 18, comprising a floating-point rounding circuit configured to:
receive the product from the dynamic multiplication circuit;
adjust the product by performing rounding or normalizing the product; and
output the adjusted product to the selection circuitry.

* * * * *